United States Patent [19]

Terashita et al.

[11] Patent Number: 5,083,154
[45] Date of Patent: Jan. 21, 1992

[54] COPYING APPARATUS, PRINT EVALUATING METHOD FOR COPYING APPARATUS, METHOD FOR SETTING PRINTING CONDITIONS, AND COPYING APPARATUS CONTROLLER

[75] Inventors: Takaaki Terashita; Fumiaki Sato, both of Kanagawa, Japan

[73] Assignee: Fuji Photo Film Co., Ltd., Kanagawa, Japan

[21] Appl. No.: 676,039

[22] Filed: Mar. 27, 1991

[30] Foreign Application Priority Data

| Apr. 2, 1990 | [JP] | Japan | 2-88067 |
| Apr. 10, 1990 | [JP] | Japan | 2-94629 |
| Apr. 10, 1990 | [JP] | Japan | 2-94630 |
| Apr. 19, 1990 | [JP] | Japan | 2-103892 |
| Apr. 20, 1990 | [JP] | Japan | 2-104875 |

[51] Int. Cl.⁵ .................... G03B 27/74; G03B 27/80
[52] U.S. Cl. ........................... 355/68; 355/38; 355/71; 355/77
[58] Field of Search .............. 355/38, 68, 71, 77

[56] References Cited

U.S. PATENT DOCUMENTS

| 3,165,970 | 1/1965 | Pelletier | 355/71 X |
| 3,685,900 | 8/1972 | Kirby et al. | 355/71 X |
| 3,754,824 | 8/1973 | Weisglass et al. | 355/71 X |
| 3,901,598 | 8/1975 | Vanheerentals | 355/77 X |
| 4,526,462 | 7/1985 | Hope et al. | 355/38 |
| 4,657,378 | 4/1987 | Hope et al. | 355/38 |

FOREIGN PATENT DOCUMENTS 63-234234 9/1988 Japan .
63-234238 9/1988 Japan .

*Primary Examiner*—Richard A. Wintercorn
*Attorney, Agent, or Firm*—Sughrue, Mion, Zinn Macpeak & Seas

[57] ABSTRACT

A copying apparatus provided with a light-attenuating filter used for controlling copying conditions. The light-attenuating filter is formed of a nontransparent member in which a multiplicity of small holes or small-width slits are provided. In setting the printing conditions for the copying apparatus, a film development-evaluating film with an evaluating latent image recorded thereon is developed, the image on the evaluating film developed is photometrically measured and printed on a paper, the printed paper is developed, and the density of a print obtained by development is measured so as to set the printing conditions. To photometrically measure the print, a punched hole provided in the paper is detected to photometrically measure a central portion of the image plane.

25 Claims, 29 Drawing Sheets

F I G. 10
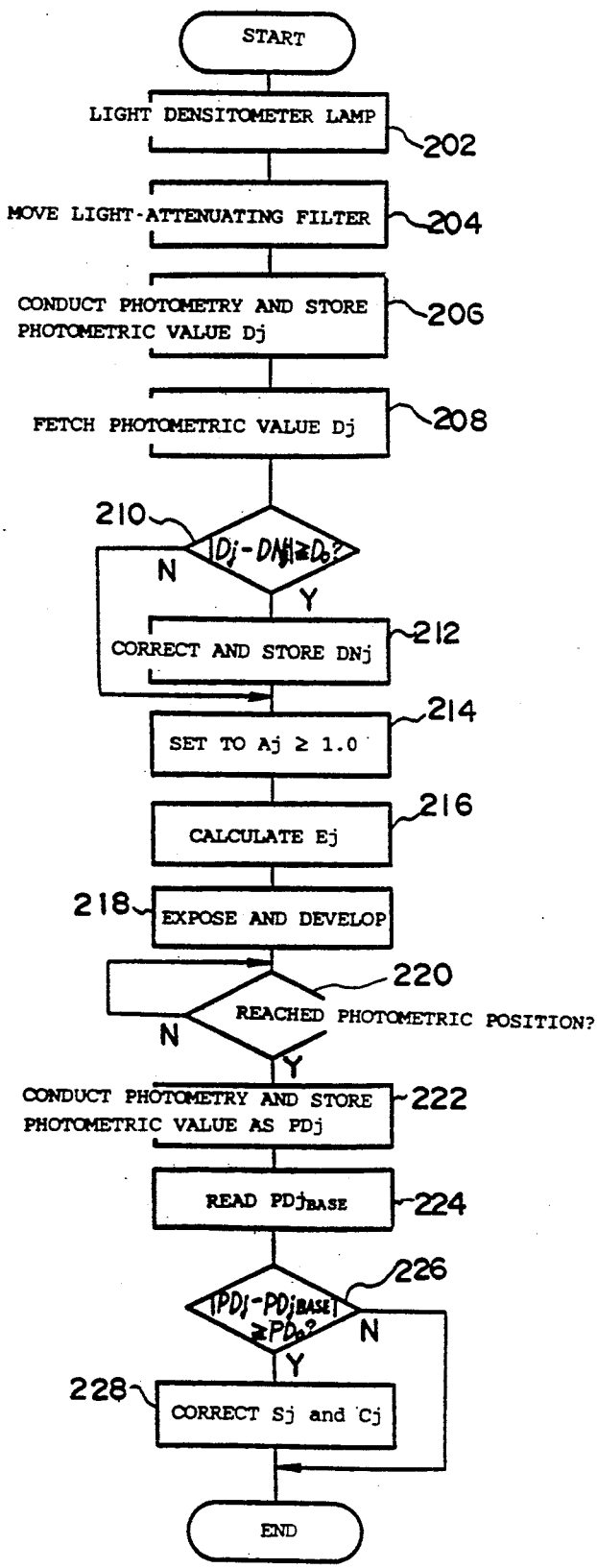

COPYING APPARATUS, PRINT EVALUATING METHOD FOR COPYING APPARATUS, METHOD FOR SETTING PRINTING CONDITIONS, AND COPYING APPARATUS CONTROLLER

BACKGROUND OF THE INVENTION

1. Field of the Invention

The present invention generally relates to a copying apparatus having a copying section for copying an image onto a copying photosensitive material in accordance with copying conditions wherein the copying conditions are corrected on the density of the density of the copied image. More particularly, the present invention concerns a copying apparatus having a light.attenuating filter for facilitating the setting of copying conditions, such as standard exposure conditions set when the copying apparatus is initially used, and the determination of the standard exposure conditions that are reset when changes occur with respect to the copying apparatus and a developing solution, as well as a print evaluating method for evaluating the quality of prints obtained from the film using this copying apparatus, a method for setting printing conditions for setting standard exposure conditions for obtaining high print quality, and a controller for controlling the copying apparatus.

2. Description of the Related Art

In photofinishing laboratories at large, a negative film is subjected to development in a film processor, and an image on the negative film developed is printed onto a printing paper by means of a color printer. Then, the printed paper is developed by a paper processor, thereby obtaining a print from the photographed film. In recent years, a printer-processors in which a printer and a paper processor are combined have become widespread, and the operation is effected in a manner similar to the one described above. When a developing solution is used for extended periods of time, it becomes impossible to maintain its proper performance owing to the influence of such as a lack of a replenishing solution, oxidation with air, evaporation of the solution, the mixing in of the solution of a preceding process, and so on. For this reason, in order to constantly maintain the quality of prints in good conditions, it is necessary to constantly control the developing solution in the film processor and and the developing solution in the paper processor or the printer-processor. Accordingly, the following measure has conventionally been adopted: First, a film development. evaluating control strip prepared by exposing a film in advance under a plurality of conditions is passed through the film processor, and a paper development-evaluating control strip prepared by exposing in advance the paper under a plurality of conditions is also passed through the paper processor or the processor section of the printer-processor. Then, a density measurement is made of the developed film or the print so as to confirm the presence or absence of any abnormality in the film developing solution or the paper developing solution.

Storage of the film development-evaluating control strip in a refrigerator is facilitated since it is supplied by being contained in a film container. In addition, by connecting this control strip to a film reader, it merely suffices to set the control strip in a film.inserting portion of the film processor. The paper development-evaluating control strip, on the other hand, is so large that it is difficult to be stored in the refrigerator. In addition, it is necessary to accommodate the paper development-evaluating control strip in a case when the control strip is set in the paper processor or the printer-processor, and it is also necessary to push out the control strip with the case being set. Hence, there has been the problem that skill and labor are required in inserting the control strip into the developing section.

As described above, since the film development-evaluating control strip can be readily set, the control strip can be handled relatively easily, and a film developing solution generating has a more stable performance than a paper developing solution. As for the paper developing solution, on the other hand, although its performance is susceptible to change, the present situation is such that it is not controlled sufficiently since the handling of the paper development-evaluating control strip is troublesome, as described above.

In addition, in order to constantly finish color prints with high quality by means of the printer and the processor or the printer.processor, it is essential to properly effect development processing by controlling the developing solutions and properly set the standard exposure conditions of the printer or the printer section of the printer-processor, as described above. For this reason, the standard exposure conditions are set at the time of setting the printer or the printer.processor, Nevertheless, it is necessary to correct and reset the standard exposure conditions since the printing conditions change in cases such as where a color paper having a different emulsion number, where an exposing lamp (printer lamp) of the exposing section is replaced, where the developing solution is replaced, and where the contents of the photograph have undergone a change from a colorful one to a less colorful one or vice versa due to a change of the season or the like. Also, printing conditions change owing to the staining or deterioration of a light source system including a light-adjusting filter, a halogen lamp, and a reflector or replacement thereof, so that it is necessary to correct and reset the standard exposure conditions in the same way as described above. In correcting the standard exposure conditions, by using a reference negative film having a portion corresponding to an average subject color around a portion corresponding to a negative on which a gray subject has been photographed, the correction is made by comparing a density of a test print printed and developed from this reference negative film and a density (targeted density) of a reference print subjected in advance to printing and development. That is, since the reference negative film has a standard subject density and a medium.gray subject density, the standard exposure conditions are corrected in such a manner that the print obtained from the reference negative film will be developed into the medium gray color.

In addition to the film and paper development-evaluating control strips, the aforementioned reference negative film is used for setting the standard exposure conditions to control the printer conditions and the light source, as described above. This reference negative film is supplied after being developed in a standard developing solution by a film manufacturer or the like, and has not been developed by the film processor which is used actually. Consequently, the standard exposure conditions set by using the reference negative film are not necessarily appropriate in photofinishing laboratories. Furthermore, since the density values obtained from the aforementioned control strips are used to evaluate only the respective processes, it is difficult to estimate the final print quality, which has been a factor leading to distrust and a lack of interest in control.

In addition, with the above-described method, there are drawbacks in that since the reference negative film is used, the correction accuracy can decline with the discoloration of the reference negative film, and that since the reference negative film is set on the negative carrier, the correction accuracy can decline due to the staining of the reference negative film. Also, since it is necessary to prepare the reference negative film for each type of film, there is another drawback in that the burden imposed on the operator increases as the number of film types increases.

To overcome these drawbacks, Japanese Patent Laid-Open Publication No. 60-113233 discloses an arrangement wherein a flap is provided on which a test film for preparing a test copy is disposed in abutment with the copying material, and the test copy is prepared on the copying material so as to obtain proper exposure conditions. This method has an advantage in that the lowering of correction accuracy due to staining can be prevented since the test film is automatically set. However, since the test film is used, the problem of discoloration occurs in the same way as described above. Additionally, since the test film abuts against the copying material, it is impossible to photometrically measure the light source system, so that there has been a drawback in that it is impossible to distinguish whether the change in the exposure conditions is due to the light source system of the printer or the printer-processor or due to the copying material and development processing (due mainly to the deterioration of the developing solution), making it impossible to correct the exposure conditions for each cause of the occurrence of the change. In addition, if the light source system is photometrically measured directly, electric charges become saturated at a measuring position, making it impossible to effect photometry at the position of the light-adjusting filter and through the light-adjusting filter. Hence, it is necessary to attenuate the light by inserting the reference negative film or the like between a photometer and the light source. However, disposing the negative film or the like between the photometer and the light source results in an undesirable drawback of discoloration and a change in the density due to heat.

The movement of a perforated plate into the path of the exposing light to prevent saturation of the photometer is conducted in a cut-filter method in which red (R), green (G), and blue (B) components of light are respectively cut by inserting a filter comprising cyan (C), magenta (M), and yellow (Y) filters, and in an additive color printing method in which the R, G, and B components of light are formed by the R, G, and B filters to independently control exposure amount, respectively. However, in a case where the perforated plate is used in a light-adjusting filter method in which the C, M, and Y filters are inserted into the optical path to control the exposure amount of R, G, and B through the amount of insertion, there is a drawback in that if the size of the perforations are large, the amount of light transmitted through the perforated plate varies abruptly owing to the movement of the light-adjusting filter, so that the photometric value does not vary smoothly. If the size of the perforations is made small, the amount of light varies by becoming loaded with dust and the like.

With the above-described printer-processor, to control and maintain standard exposure conditions, control of the state of the printer-processor is conducted by describing the test print density and the state of the developing solutions on a control chart. By using such a control chart, it is possible to determine the tendency of changes regarding the printer-processor, and so on.

With the conventional techniques, however, there have been drawbacks in that no function is provided for automatically obtaining control data, that it is time-consuming to prepare the control chart to which the control data needs to be transcribed, and that effective use is not made of the control data obtained.

Meanwhile, an apparatus is known in which data stored in the printer-processor are transmitted from the printer-processor to a central computer by using a data communication means, and the data are stored, processed, and displayed for a determination. However, since the printer-processor is not provided with a storage unit for storing data in a time series, only the data stored when an instruction for data communication was given are transmitted. Accordingly, there are numerous problems in that it is unclear whether or not the data obtained is novel, the amount of data is limited in light of the communicating time, and equipment is involved for returning the data collected in the central computer back to the printer-processor, in addition to the cost involved therein. Furthermore, to make an overall judgement of detected values and measured values, an accurate judgement of the data is difficult unless the periods of the data obtained are clearly known.

In addition, a method for measuring an image copied on a copying photosensitive material such as a test print varies depending on the copying apparatus. For instance, in a case where a density measurement is made of an image copied by a copying apparatus which is not provided with a density measuring section, the operator sets the copying photosensitive material with the image copied thereon in a densitometer which is separate from the copying apparatus, and then operates the densitometer to measure the density of the image. With this measuring method, since the operator's manual operations are required such as the setting of the copying photosensitive material in the densitometer and the operation of the densitometer, it is impossible to effect measurement of the densitometer at high speed.

Meanwhile, in a case where a density measurement is made of an image copied by a copying apparatus which is provided with a density measuring section for measuring an image density and in which control of a transporting system for transporting a copying photosensitive material and of a density measuring section is conducted separately, the operator sets the copying photosensitive material in the density measuring section so as to measure the density. With this measuring method as well, the operator's manual operations are required in the same way as described above, it is impossible to measure the image density at high speed.

Also, a copying apparatus is known which is provided with a density measuring section for measuring an image density and permits automatic measurement of the image density by synchronizing the operating timing of the density measuring section with a transporting system for transporting the copying photosensitive material. With this copying apparatus, the operator's manual operations are not required and measurement of the image density at high is possible.

However, with the copying apparatus which permits automatic measurement of an image density, it is necessary to position each image copied by the copying apparatus at a measuring position of the density measuring section. Conventionally, this positioning is effected by stopping the transport after the lapse of a fixed time upon copying processing. Consequently, since it is necessary to measure the elapsed time since copying processing with respect to each image, processing has been complicated. Also, positioning errors are liable to occur, so that it has been difficult to effect accurate positioning.

Generally, copying apparatus for copying images onto an elongated copying photosensitive material have a cutter section for cutting the copying photosensitive material, and a cutting portion of the image is positioned at a cutting position of the cutter section so as to cut the copying photosensitive material into image units. Consequently, with the aforementioned copying apparatus capable of automatically measuring an image density, the positioning of an image at the density-measuring position and the positioning of a cutting position of the image at the cutter section are conducted, so that the positioning processing has been complicated.

With the copying apparatus capable of automatically measuring an image density, since the measurement of an image density is conducted continuously with respect to a plurality of images copied onto the printing paper, it is necessary to control the image densities measured in correspondence with the images. Thus, in cases where post processing is effected with respect to each image, it becomes necessary to effect control by allowing each item of data on images to correspond with the respective images.

For this reason, there has been proposed a method of classification and control in which each item of data is made to correspond with each image by punching holes in printing paper, the number of such punched holes and the distance between adjacent ones of the punched holes being varied (refer to Japanese Patent Laid-Open Publication No. 63-234234).

However, with the aforementioned method of classification and control, in order to effect control by allowing the data on the images to correspond with the images, it is necessary to provide the copying apparatus with both a puncher for punching holes and a sensor for detecting the punched holes, so that the arrangement of the copying apparatus has been complicated.

In cases where the density of each image is automatically measured as post processing of each image, it is necessary to conduct measurement with the density-measuring portion of each image positioned at the density-measuring position. However, with the method of measuring the image density by detecting the position of the image by means of the punched hole, the sensor for detecting the punched hole needs to be provided in the vicinity of the density-measuring position, thereby making the arrangement of the copying apparatus complicated.

Furthermore, with the copying apparatus having the density measuring section for automatically measuring the density of an image, the level of an output signal from the density measuring section fluctuates due to fluctuations of a supply voltage or the like, so that the level adjustment o the output signal is conducted. However, there are cases where the supply voltage fluctuates after the level adjustment, in which case accurate density values are impossible to obtain.

SUMMARY OF THE INVENTION

Accordingly, the present invention has as its object to provide a method for evaluating a print which makes it possible to effect control of developing solution performance corresponding to print quality by capitalizing on the advantage of a film development-evaluating control strip which is easy to use and store, and to provide a method for setting printing conditions capable of properly setting standard exposure conditions at photofinishing laboratories, thereby overcoming the above-described drawbacks of the conventional art.

Another object of the present invention is to provide a copying apparatus having the function of permitting the photometry of a light source system to be conducted with high accuracy, such as detection of a change in a light source and photometry at the position of a light-adjusting filter and through the light-adjusting filter by preventing a state of saturation of a photometer, as well as the function of controlling exposure conditions.

Still another object of the present invention is to provide a copying apparatus controller capable of automatically storing control data together with a time of collection of the data and displaying the same in a printer. processor.

A further object of the present invention is to provide a copying apparatus which, with a simple structure, is capable of simply and accurately effecting the positioning of an image at a measuring position of an image-density measuring section.

A still further object of the present invention is to provide a copying apparatus which, with a simple structure, is capable of measuring an image density and effecting control by allowing an image and a measured density value to correspond with each other.

A further object of the present invention is to provide a copying apparatus capable of minimizing the effect of fluctuations of a supply voltage or the like and of obtaining accurate density values.

To these ends, in accordance with a first aspect of the present invention, there is provided a method for evaluating a print, comprising the steps of: developing in a film developing section a film-development evaluating film with an evaluating latent image recorded thereon; printing onto a paper the image on the film obtained by development; developing the printed paper in a paper developing section; and measuring a density of a print obtained by development so as to evaluate the quality of the print.

In the first aspect of the invention, both the evaluation of the performance of film development and the determination of exposure conditions at a time of printing the paper may be effected by photometrically measuring an image on the evaluating film obtained by development. It is effective to provide an arrangement in which evaluating latent images whose densities become at least a low density, a medium density, and a high density are recorded on the evaluating film, and a difference between two densities of a latent image-recorded portion is selectively used for the evaluation of the performance of a film developing solution and the performance of a paper developing solution. It is also effective to adopt an arrangement in which at the time of printing images on the evaluating film onto the paper, at least two images having different densities among at least the three evaluating densities of the low density, medium density, and high density are printed onto the paper with an identical exposure amount.

In accordance with a second aspect of the invention, there is provided a method for setting printing conditions, comprising the steps of: developing in a film developing section a film-development evaluating film with an evaluating latent image recorded thereon; photometrically measuring the image on the evaluating film obtained by development, and printing the image onto a paper; developing the printed paper printed in a paper developing section; and measuring a density of a print obtained by development so as to set standard exposure conditions. In this aspect of the invention, at the time of printing images on the evaluating film onto the paper, the standard exposure conditions may be set such that densities of prints based on at least one film density of an image or one set of images become their respective targeted densities.

By focusing attention on the fact that the print quality is determined by a combination of the performance of a film developing solution and the performance of a paper developing solution, the present invention aims at finally determining the print quality through the combination of the two developing solutions. For this reason, in the first aspect of the invention, the film development-evaluating film with an evaluating latent image recorded thereon is developed in a film developing section, the image on the film obtained by development is printed onto a paper, the printed paper is developed in a paper developing section, and the density of the print obtained by development is measured so as to evaluate the print quality. Thus, in accordance with the first aspect of the invention, only the film development-evaluating film, i.e., a film development evaluating control strip, is used, and the print quality is evaluated by a combination of the performance of the film developing solution and that of the paper developing solution without making a distinction between the performances of the two developing solutions. Evaluating latent images whose densities become at least a low density, a medium density, and a high density are recorded on the film development-evaluating film. Then, in the evaluation of the performance of the film developing solution and in the evaluation of the performance of the paper developing solution, a difference between two densities of a latent-image recorded portion is selectively used. At the time of printing images on the evaluating film onto the paper, at least two images having different densities among at least the three evaluating densities of the low density, medium density, and high density are printed onto the paper with an identical exposure amount. With the present invention, since only the film development evaluating film is used, as described above, storage and use of the film are facilitated and the number of kinds of control strips used can be reduced.

In the above-described arrangement, if and when the print quality has deteriorated, it is impossible to judge which of the film developing solution and the paper developing solution has undergone a decline in performance. However, if the performance of film development is evaluated by measuring the image on the film obtained by development, it is possible to ascertain the developing solution which has undergone a decline in performance. On the basis of a photometric value of this film image, it is possible to determine and set the standard exposure conditions for printing onto the paper. At the time of setting the standard exposure conditions, the standard conditions are set such that densities of prints based on at least one film density of an image or one set of images become their respective targeted densities. In addition, although the variation of paper sensitivity cannot be evaluated in the present invention, the variation of paper sensitivity and the variation of the film developing performance can be corrected by correcting the exposure conditions at the time of printing on the paper. The evaluation of paper sensitivity and evaluation of film development are unimportant in the present invention. On the other hand, the tricolor g balance is important since it cannot be corrected by exposure amount. For this reason, the tricolor g balance incorporating both the film and the paper is judged by using a difference between at least two different densities among at least three densities of a print, including a low density, a medium density, and a high density.

As described above, in accordance with the present invention, the state of the film processor and the paper processor is evaluated on the basis of the film development-evaluating film, so that a paper development-evaluating control strip is not required. Consequently, only the evaluating film which features easy handling and storage can be used, and the quality of actual prints obtained from the system of the film processor and the paper processor or the printer-processor being used can be evaluated. Accordingly, it is possible to obtain the advantage that the accuracy of evaluation of print quality can be enhanced. In addition, it is possible to obtain another advantage in that standard exposure conditions can be set by taking the performance of the film processor into consideration by using the film development-evaluating film employed.

To attain the above-described objects, in accordance with a third aspect of the present invention, there is provided a copying apparatus for exposing an original image supported on a film carrier onto a copying photosensitive material by application of light thereto from a light source via a light-adjusting filter, wherein a light-attenuating filter formed of a nontransparent member and having a multiplicity of small holes or small-width slits for setting a copying condition is disposed in a path of exposing light between the light source and the film carrier in such a manner as to be capable of moving into or out of the path of the exposing light.

The light-attenuating film may be formed integrally of a transparent member and the nontransparent member. In addition, a small-width slit may be provided in the nontransparent member having the multiplicity of small-width slits, the small-width slit being oriented in a direction different from a longitudinal direction of each of the small-width slits.

In the third aspect of the invention, by moving the light-attenuating filter into the path of the exposing light, at least one of the variation of an amount of light applied to the original image, the variation of a position of the light-adjusting filter, and the variation of development processing of the copying photosensitive material may be measured, or at least one of the setting of the standard exposure conditions, control of the standard exposure conditions, and maintenance of the standard exposure conditions may be effected.

With the copying apparatus in accordance with the third aspect of the invention, an original image supported on a film carrier is exposed onto a copying photosensitive material by application of light thereto from a light source via a light-adjusting filter. A light-attenuating filter is disposed in a path of exposing light between the light source and the film carrier in such a manner as to be capable of moving into or out of the path of the exposing light. The light-attenuating filter is formed of a nontransparent member constituted by a metal plate or the like provided with a multiplicity of small holes or small width slits. By moving this light-attenuating filter into the path of the exposing light, the amount of light received by the photometer is reduced, so that it is possible to prevent a state of saturation of the photometer. The position in which the light-attenuating filter may be any position between the film carrier and the light source, but a position between a diffusion box and the light source that are provided in the light source system is suitable. A transparent member may be formed integrally with the nontransparent member, and the light-attenuating filter may be provided with wavelength selectivity by depositing a multilayered film on the transparent member. Furthermore, since the nontransparent member is provided with the small holes or small-width slits, the variation of the amount of light transmitted through the light-attenuating filter becomes small relative to the amount of unit movement of the light-adjusting filter, so that the variation of a photometric value at the time when the light-adjusting filter is moved can be made smooth. Furthermore, since the nontransparent member and the transparent member are combined, by orienting the transparent member on a side where dust and the like are liable to attach, it is possible to prevent the nontransparent member from becoming loaded with the dust or the like. In a case where the light attenuating filter is disposed in the vicinity of the light source, in order to prevent the effect of thermal expansion, a small-width slit may be provided in the nontransparent member in such a manner as to be oriented in a direction different from a longitudinal direction of each of the small-width slits.

By effecting photometry by manually or automatically moving the light-attenuating filter into the path of the exposing light, it is possible to measure the variation of the amount of light applied to the original picture, i.e., the variation of the amount of light of the light source system, as well as the position of the light-adjusting filter. In addition, if a photometric value obtained by photometry through the light-attenuating filter is used as a reference, it is possible to conduct at least one of the setting, control, and maintenance of the standard exposure conditions.

As described above, in accordance with the third embodiment of the invention, an advantage can be obtained in that the photometry of the light source system can be conducted accurately on a stable basis by using the light-attenuating filter provided with small holes or the like and formed of the nontransparent member. In addition, since the photometry of the light source system can be conducted with high accuracy by making use of the light-attenuating filter, an additional advantage is obtained in that the setting of copying conditions such as the setting, control, and maintenance of the standard exposure conditions can be automatically conducted with high accuracy.

To attain the aforementioned objects, in accordance with a fourth aspect of the present invention, there is provided a copying apparatus controller for controlling a copying apparatus having an exposing section and a developing section, comprising: storage means for storing, together with a time of storage, control data representing a state of at least one of the exposing section and the developing section; and displaying means for displaying in a time series the contents stored in the storage means.

In accordance with a fifth aspect of the present invention, there is provided a copying apparatus controller for controlling a copying apparatus having an exposing section and a developing section, comprising: first detecting means for detecting a change in the exposing section; second detecting means for detecting a change in the developing section; storage means for storing, together with a time of detection, a detected value of the first detecting means and a detected value of the second detecting means; and displaying means for displaying in a time series the contents stored in the storage means.

In accordance with a sixth aspect of the present invention, there is provided a copying apparatus controller for controlling a copying apparatus having an exposing section and a developing section, comprising: first detecting means for detecting a change with respect to the exposing section; second detecting means for detecting a change with respect to the developing section; setting means for setting data for maintaining a proper state on the basis of the first and second detecting means; storage means for storing, together with a time of detection or setting, a detected value of the first detecting means, a detected value of the second detecting means, and a set value of the setting means; and displaying means for displaying in a time series the contents stored in the storage means.

The aforementioned first detecting means is capable of detecting a change in the light source system of the exposing section.

The copying apparatus in accordance with the fourth to sixth embodiments is provided with the exposing section and the developing section. Included in this type of copying apparatus is a photographic printing and developing apparatus having an exposing section for exposing a film image onto a paper and a developing section for developing the exposed paper. There are cases where this photographic printing and developing apparatus is used by being combined with or integrated with a film developing apparatus having only the developing section for developing a film. In the fourth aspect of the invention, the storage means stores, together with a time of storage, control data representing a state of at least one of the exposing section and the developing section. The displaying means displays in a time series the contents stored in the storage means. The first detecting means in accordance with the fifth aspect of the invention detects a change in the exposing section as control data, while the second detecting means detects a change in the de;eloping section as control data. The change in the exposing section can be determined by photometrically measuring the optical system with the light-attenuating means moved into the path of the exposing light. The change in the exposing section may alternatively be determined by manually setting a control negative or a filter in the optical path and effecting photometry. Furthermore, it is possible to detect as control data an electric current flowing across a lamp of the exposing section, a control signal for controlling the light-adjusting filter, the position of the light-adjusting filter, and the amount of light transmitted through the light-adjusting filter. The change in the developing section can be determined by measuring the density of the paper obtained by developing a reference paper in the developing section. To detect the change in the developing section of the film developing apparatus, it suffices to measure the density of the film obtained by developing an undeveloped reference film in this developing section. Additionally, it is also possible to effect exposure on the paper in the exposing section by using a developed reference film, and detecting the density of a print obtained by developing the paper exposed. At this time, if an image on the reference film is exposed on the paper after correcting the change in the exposing system, and the density of the print obtained by development is measured, it is possible to detect the change in the developing section separately from the change in the exposing section. Then, with respect to the change in the developing section, printing conditions and the like are corrected and set in a predetermined memory. Control data consisting of detected values and set values such as those just mentioned, together with a time of detection or setting, e.g., a date, are stored in a control data storage unit. The displaying means displays in a time series the contents stored in the control data storage unit. To display the contents in a time series, it suffices to display control data by using a time axis. In addition to the detected values and set values, data necessary for various other items of control may be stored as the control data.

As described above, since the detected values and set values are stored in the control data storage unit, transcription of the detected values and the like become unnecessary in preparing a control chart. Accordingly, it is readily possible to store and utilize numerous kinds of control data. Additionally, since the detected values and the like are displayed in a time series, the tendency of changes can be ascertained, so that an abnormality and the like can be detected at an early period.

As described above, in accordance with the fourth to sixth aspects of the invention, since various detected values and photometric values are stored automatically, advantages can be obtained in that the state of each function can be displayed by analyzing the control chart readily without transcribing the detected values and photometric values, and that it is possible to make an overall judgment on the basis of various detected values and photometric values. Also, although control data have hitherto been sorted out insufficiently and remained difficult to evaluate, there is an additional advantage in that it becomes possible to process, rearrange, and display the data so as to make sufficient use of them.

In accordance with a seventh aspect of the present invention, there is provided a copying apparatus comprising: transporting means for transporting along a transporting path a copying photosensitive material having an image copied thereon, the copying photosensitive material being provided with a mark in correspondence with a density-measuring portion of the copied image; mark detecting means for detecting the presence or absence of the mark at a predetermined position on the transporting path; a density measuring section disposed at a position for obtaining a corresponding relationship between the density-measuring portion and the mark relative to the predetermined position; and controlling means for controlling the density-measuring portion in such a manner that a density value measured by the density measuring section is fetched when the presence of the mark is detected by the mark detecting means.

In accordance with an eighth aspect of the present invention, there is provided a copying apparatus comprising: transporting means for transporting along a transporting path a copying photosensitive material having an image copied thereon, the copying photosensitive material being provided with a mark in correspondence with a density-measuring portion and cutting portion of the copied image; mark detecting means for detecting the presence or absence of the mark at a predetermined position on the transporting path; a density measuring section disposed at a position for obtaining a corresponding relationship between the density-measuring portion and the mark relative to the predetermined position; a cutter section for cutting the copying photosensitive material at a predetermined cutting position on the transporting path; and controlling means for controlling the density-measuring portion in such a manner that a density value measured by the density measuring section is fetched when the presence of the mark is detected by the mark detecting means, and for actuating the cutter section on the basis of a timing at which the presence of the mark is detected by the mark detecting means.

In the eighth aspect of the present invention, the cutter section is preferably disposed at a position for obtaining a corresponding relationship between the cutting portion and the mark relative to the predetermined position.

In the seventh and eighth aspects of the present invention, the mark detecting means may be disposed on the transporting path between the density measuring section and the cutter section.

In the seventh aspect of the present invention, a mark is imparted to the copying photosensitive material in correspondence with a density-measuring portion of each image copied onto the copying photosensitive material, and the mark detecting means detects the presence or absence of the mark at a predetermined position on the transporting path. The density measuring section is disposed at a position for obtaining a corresponding relationship between the density measuring portion and the mark relative to the predetermined position. Accordingly, since the density-measuring portion of the copying pohotosensitive material corresponds with the density measuring position when the presence of the mark is detected by the mark detecting means, it is possible to fetch the density value measured by the density measuring section, and the positioning of the density measuring portion of the image at the density-measuring position can be effected simply and accurately. To fetch the density value, it suffices if the transport is stopped upon detection of the mark, and the density measuring section is then operated to fetch the density value, or the density measuring section is kept operating and the density value is fetched upon detection of the mark without stopping the transport.

In the eighth aspect of the present invention, a mark is imparted to the copying photosensitive material in correspondence with a density-measuring portion and cutting portion of each image copied onto the copying photosensitive material. Upon detection of the presence of the mark, the density value measured by the density measuring section is fetched, and the cutter section is operated on the basis of the timing at which the presence of the mark was detected by the mark detecting means. Accordingly, since the density measurement and cut processing are conducted by making use of one mark, there is no need for the density measuring section and the cutter section to be provided with mark detecting sections, respectively, so that the arrangement of the copying apparatus can be simplified.

In addition, by disposing the cutter section at a position for obtaining a corresponding relationship between the cutting portion and the mark relative to the predetermined position, upon detection of the presence of the mark by the mark detecting means, the density measuring portion is made to correspond with the density measuring section and the cutting portion is made to correspond with the cutter section. Accordingly, since the fetching of the density value measured by the density measuring section and the operation of the cutter section can be effected when the presence of the mark is detected, the positioning of the density-measuring portion of the image at the density measuring section and the positioning of the cutting portion at the cutter section can be effected simply and accurately.

As described above, in the seventh aspect of the present invention, since the density measuring section is disposed at a position for obtaining a corresponding relationship between the density-measuring portion and the mark relative to the predetermined position on the transporting path where the presence or absence of the mark is detected, an advantage can be obtained in that the positioning of the density-measuring portion of the image at the density measuring section can be effected simply and accurately.

In the eighth aspect of the present invention, the arrangement provided is such that upon detection of the presence of the mark, the density value measured by the density measuring section is fetched and the cutter section is operated on the basis of the timing at which the presence of the mark was detected by the mark detecting means, so that an advantage can be obtained in that the arrangement of the copying apparatus becomes simple.

Furthermore, since the cutter section is disposed at a position for obtaining a corresponding relationship between the cutting portion and the mark relative to the predetermined position on the transporting path where the presence or absence of the mark is detected, an advantage can be obtained in that the positioning of the density-measuring portion of the image at the density measuring section can be effected simply and accurately.

In accordance with a ninth aspect of the present invention, there is provided a copying apparatus having a copying section for copying an image onto a copying photosensitive material in accordance with copying conditions, the copying conditions being corrected on the basis of a density of the copied image, comprising: a processing section for processing the copying photosensitive material with the image copied thereon, while transporting the copying photosensitive material; a density measuring section disposed on an outlet side of the processing section and adapted to output a signal by measuring the density of the image; passage detecting means for detecting the passage of the copying photosensitive material upstream of the density measuring section in a direction of travel of the copying photosensitive material; and controlling means for effecting control in such a manner that the signal outputted from the density measuring section is fetched thereby after the lapse of a time corresponding to a time elapsing since the passage of the copying photosensitive material is detected by the passage detecting means until the copying photosensitive material reaches the density measuring section.

In accordance with a tenth aspect of the present invention, there is provided a copying apparatus having a copying section for copying an image onto a copying photosensitive material in accordance with copying conditions, the copying conditions being corrected on the basis of a density of the copied image, comprising: a processing section for processing the copying photosensitive material with the image copied thereon, while transporting the copying photosensitive material; a density measuring section disposed on an outlet side of the processing section and adapted to output a signal by measuring the density of the image; and controlling means for fetching the signal outputted from the density measuring section and for controlling the density measuring section in such a manner as to effect the level adjustment of the output signal from the density measuring section immediately before the copying photosensitive material processed in the processing section passes through the density measuring section.

In addition, the copying apparatus may further comprise passage detecting means for detecting the passage of the copying photosensitive material upstream of the density measuring section in a direction of travel of the copying photosensitive material, wherein the controlling means controls the density measuring section in such a manner as to effect the level adjustment of the output signal from the density measuring section immediately before the lapse of a time corresponding to a time elapsing since the passage of the copying photosensitive material is detected by the passage detecting means until the copying photosensitive material reaches the density measuring section.

In the above-described copying apparatus, a mark may be imparted to the copying photosensitive material in correspondence with a position of an image, and there may be provided mark detecting means for detecting the presence or absence of the mark at a predetermined position on a copying photosensitive material-transporting path, wherein the level adjustment of the output signal from the density measuring section is effected on the basis of a timing at which the presence of the mark is detected by the mark detecting means.

The copying apparatus may further comprise detecting means disposed between the processing section and the density measuring section and adapted to detect the passage of the copying photosensitive material, wherein the controlling means controls the density measuring section in such a manner as to effect the level adjustment of the output signal from the density measuring section when the passage of the copying photosensitive material is detected by the detecting means.

In the ninth aspect of the present invention, control is effected in such a manner that the signal outputted from the density measuring section is fetched after the lapse of a time corresponding to a time elapsing since the passage of the copying photosensitive material is detected by the passage detecting means until the copying photosensitive material reaches the density measuring section. Accordingly, since it is possible to detect the timing at which the image corresponds with the density measuring section by controlling the time elapsing since the detection of the passage, there is no need for provision of a sensor for detecting the position of the image, so that the arrangement of the copying apparatus can be simplified. In addition, in cases where the densities of a plurality of images copied onto the copying photosensitive material are measured sequentially, since the order of the images corresponds with the order of the signals fetched, it is possible to effect control by allowing the images to correspond with the density values measured.

In the tenth aspect of the present invention, the level adjustment of the output signal from the density measuring section is effected immediately before the copying photosensitive material processed in the processing section passes through the density measuring section. For this reason, it is possible to minimize the variation of the output signal due to fluctuations of a supply voltage or the like, thereby making it possible to obtain more accurate density values.

In the ninth aspect of the present invention, the signal outputted from the density measuring section is fetched after the lapse of a time corresponding to a time elapsing since the passage of the copying photosensitive material is detected by the passage detecting means until the copying photosensitive material reaches the density measuring section. Hence, an outstanding advantage is obtained in that it is possible to realize, with a simple structure, measurement of an image density and provision of control by allowing an image and a measured density value to correspond with each other.

In the tenth aspect of the invention, since the level adjustment of the output signal from the density measuring section is conducted immediately before the copying photosensitive material processed in the processing section passes through the density measuring section, an outstanding advantage is offered in that it is possible to minimize the effect of fluctuations of a supply voltage or the like and obtain accurate density values.

The above and other objects, features and advantages of the present invention will become more apparent from the following detailed description of the invention when read in conjunction with the accompanying drawings.

BRIEF DESCRIPTION OF THE DRAWINGS

FIG. 10 is a flowchart illustrating a routine for correcting standard exposure conditions;

DESCRIPTION OF THE PREFERRED EMBODIMENTS

Figure 1:
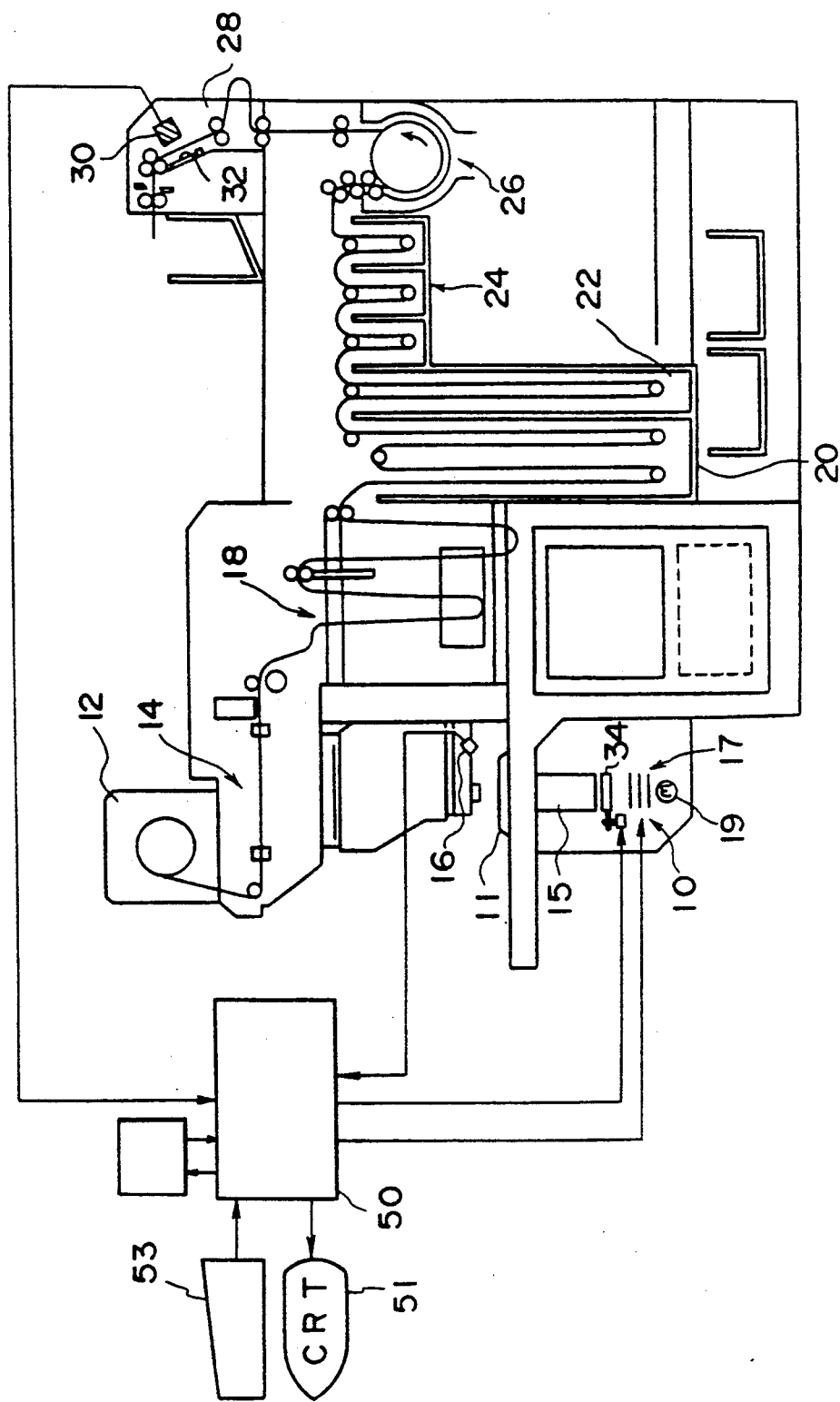
FIG. 1 is a schematic diagram of a printer-processor to which the invention is applied.

Referring now to the accompanying drawings, a detailed description will be given of a first embodiment in which the present invention is applied to a printer-processor. FIG. 1 illustrates a printer-processor to which the present invention is applicable. This printer-processor comprises a light source section 10, including a light-adjusting filter 17 constituted by C, M, and Y filters, a light-diffusion box 15 and a halogen lamp 19, and a paper magazine section 12 with a color print paper accommodated therein. In addition, a photometer 16 constituted by a two.dimensional image sensor or the like is disposed for photometrically measuring the image plane of a color negative carried on a negative carrier 11. This photometer 16 is connected to a control circuit 50. The control circuit 50 executes routines which will be described later, for automatically determining exposure amount due to the density of the negative film on the basis of standard exposure conditions and photometric values and controlling the exposure conditions by controlling the light-adjusting filter of the light source section 10. In an exposing section 14, an image on the negative film is printed onto the color print paper drawn out from the paper magazine section 12, and the color print paper thus printed is fed to a color development section 20 via a reservoir 18. The color print paper developed in the color development section 20 is subjected to fixation processing in a bleach-.fixing section 22 and is then washed in a rinsing section 24 to produce a color print. The washed color print is subjected to dry processing in a drying section 26 and is then cut into units of image frames in a cutter section 28. A densitometer 30 connected to the control circuit 50 and a white.color plate 32 for calibration are disposed in this cutter section 28 in such a manner as to oppose the color print being transported from both sides thereof. Also connected to the control circuit 50 are a CRT 51 for displaying data and the like, a keyboard 53 for entering the data and the like, and a control data storage unit 60 for storing control data.

A light-attenuating filter 34 capable of being moved into or retracted from the path of the exposing light is disposed between the light-adjusting filter 17 and the light-diffusion box 15 in the light source section 10. A metal filter having meshes or slits, or a deposited filter composed of a multilayered film, such as any one of the light-attenuating filters (see FIGS. 5, 6A, and 6B) which will be described later, is used as the light-attenuating filter 34. This light-attenuating filter 34 can be moved into or retracted from the optical path, when necessary, by a motor or the like.

Figure 2:
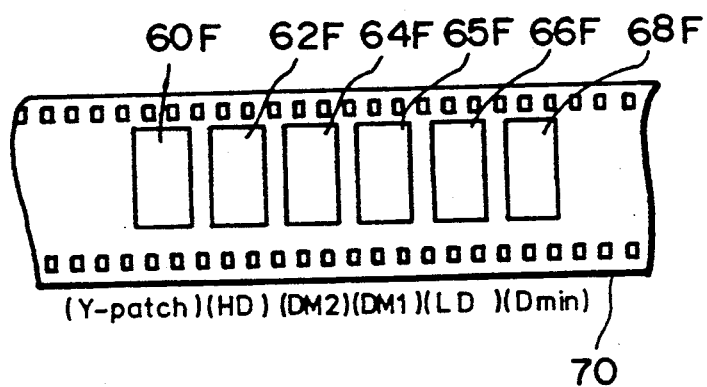
FIG. 2 is a plan view of a negative film obtained by developing a control strip.
Figure 3:
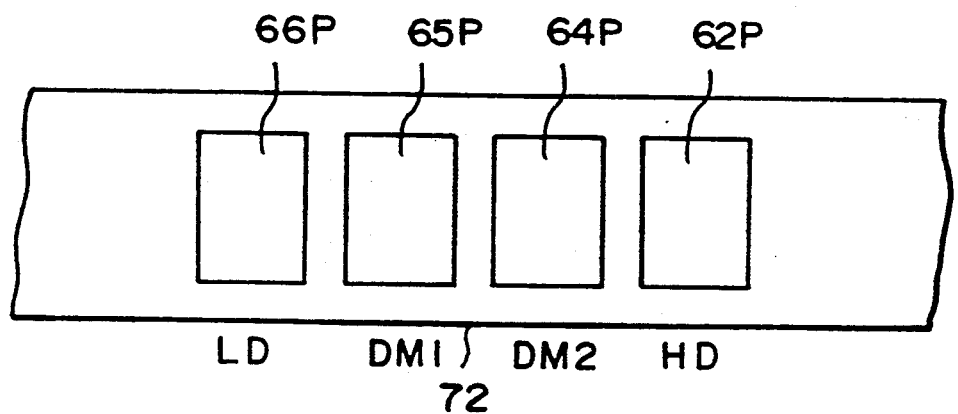
FIG. 3 is a plan view of a print obtained by printing the control strip.

In the control circuit 50, printing is effected by controlling the light-adjusting filter 17 on the basis of an exposure control value Ej shown in the following formula:

$$\log E_j = S_j \cdot \{A_j(dD_j - dw_j) + dw_j\} + C_j \quad (1)$$

where $$dD_j = D_j - DN_j \quad (2)$$

$$dw_j = \left(\sum_{j=1}^{3} dD_j\right)/3 \quad (3)$$

where
j: integer selected from 1–3, representing any one of red (R), green (G) and blue (B)
Dj: image density (e.g., an average density of the entire image plane) of an individual film image frame
DNj: average image density (e.g., an average image plane density) of a standard negative film or a multiplicity of film frames
Sj: slope control value
Aj: color correction value
Cj: color balance value dependent on the printe,r film, and photographic paper characteristics A control slip for development in accordance with the present invention is used for evaluating both film development and paper development. This control strip has at least one density measurement region between a LD (low density) portion and a HD (high density) portion that are measurement regions of a conventional control strip for development. In addition to, for instance, a minimum density $D_{min}$ (e.g. base density), a low density LD (e.g. a density in the vicinity of $D_{min}+0.3$), a high density HD (e.g. a density greater than the LD by 1.6), and a desilvering degree-controlling density Y-patch, this cotnrol strip is provided with a first medium density MD1 (e.g. a density in the vicinity of $D_{min}+0.7$) and a second medium density MD2 (e.g. a density in the vicinity of $D_{min}+1.2$) so as to allow latent images of varying densities to be recorded for exposure. The reason for the provision of the medium densities MD1 and MD2 in addition to the LD and HD is that when the LD and HD are printed on the paper, either of them falls outside the density-reproducible region of the paper. For this reason, finer density steps are provided on the film in addition to the LD and HD. By developing this control strip in a film developing solution, a negative film 70 having images 60F, 62F, 64F, 65F, 66F, and 68F corresponding to the respective latent images is obtained as shown in FIG. 2. In addition, a print 72 shown in FIG. 3 is obtained by printing the images 62F, 64F, 65F, and 66F of this negative film 70 onto the paper and developing them in the paper developing solution.

Figure 4:
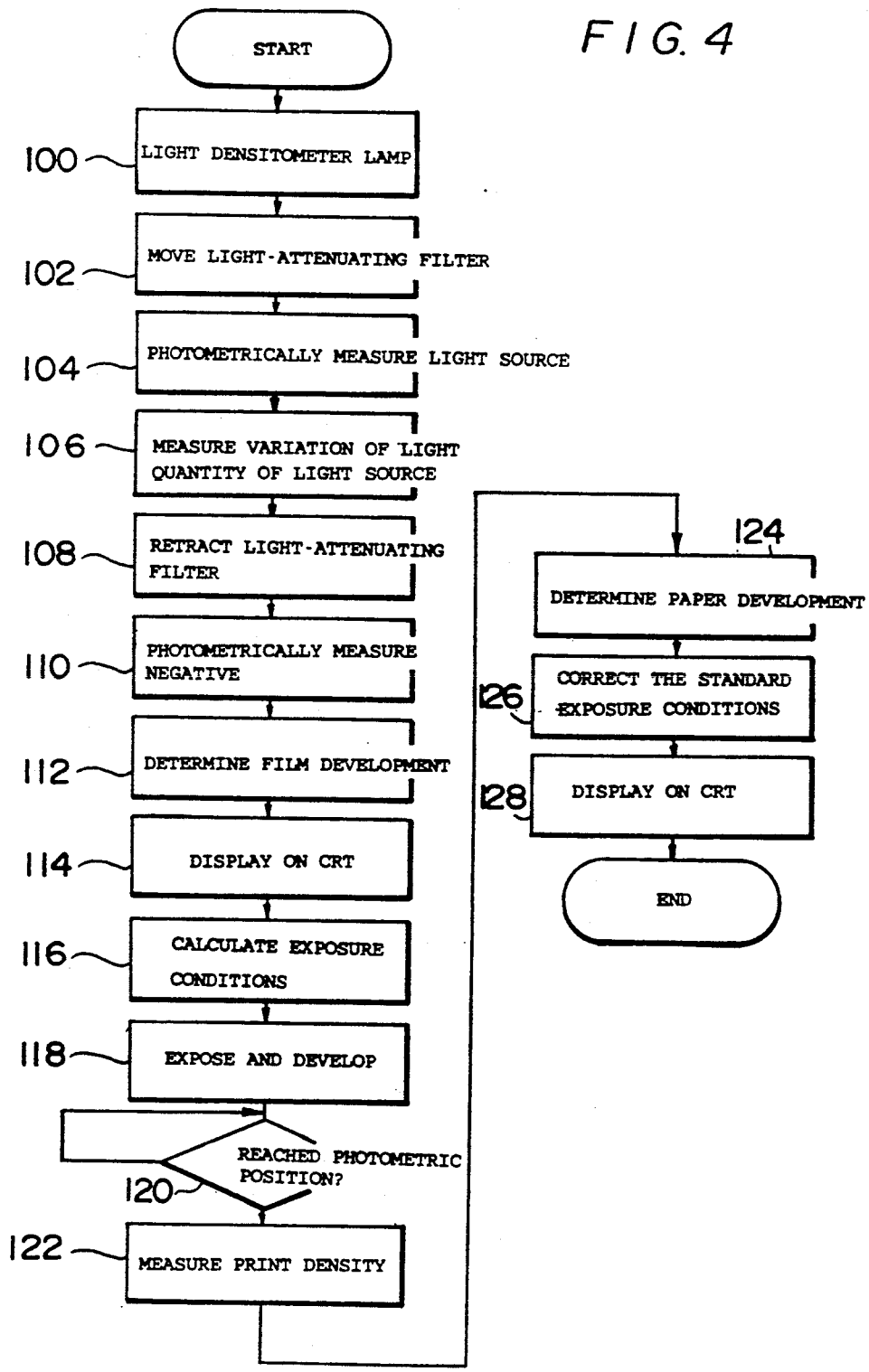
FIG. 4 is a flowchart illustrating a print quality evaluating routine in accordance with a first embodiment of the present invention.

Referring now to FIG. 4, a description will be given of a film evaluating routine in accordance with this embodiment. If a switch for evaluating a print is turned on, a routine shown in FIG. 4 is started. In Step 100, the lamp of the densitometer 30 lights up. In several dozen seconds after the lamp is lit, the density measurement by the densitometer 30 becomes possible. In Step 102, the light-attenuating filter 34 is moved into the path of the exposing light, and the light source is photometrically measured through the light-attenuating filter 34 in Step 104. The reason for moving the light-attenuating filter into the optical path is to prevent an output of the photometer 16 from becoming saturated at the time of obtaining a correction value or a reference value with respect to the variation of the light quantity of the light source. In Step 106, the variation of the light quantity of the light source is measured. Specifically, a comparison is made between a photometric value of the light source and a reference value already stored in the memory (or a previous photometric value), and the change in the light quantity of the light source is examined so as to obtain a light.source corrected value. Thereafter, measured values are corrected by their correction values. As an alternative method, a photometric value obtained by moving the light-attenuating filter into the optical path may be set as the reference value (e.g. a density 0.00). In an ensuing Step 108, the light-attenuating filter 34 is retracted from the path of the exposing light. The operator develops in advance a control strip by means of a film processor, and sets the negative film 70 obtained on the negative carrier. In Step 110, the negative film 70 is photometrically measured. In the photometric measurement, measurement regions may be photometrically measured one at a time, or a plurality of measurement regions may be photometrically measured simultaneously by using a two-dimensional image sensor or the like.

In an ensuing Step 112, a comparison is made between respective reference values stored in advance in the memory and film development.controlling values, including a photometric value of the low density LD, contrast (HD-LD) in which the photometric value of the low density LD is subtracted from a photometric value of the high density HD, a photometric value of the minimum density $D_{min}$, and a photometric value of the desilvering degree controlling density Y-patch, so as to determine the film developing performance. To evaluate the print quality, only the contrast (HD-LD) of three colors may be used as the film controlling value. The low density LD is used for controlling the sensitivity and sensitivity balance of the film, while the minimum density $D_{min}$ is used for determining fogging due to the developing solution. These photometric values can be corrected by the printer. Even if the low density LD and the minimum density $D_{min}$ deviate from conventional allowable limits, if the contrast (HD-LD) falls within an allowable range, it can be said that the resultant print quality is within an allowable range. These photometric values are those obtained after the variation of the light quantity of the light source is corrected in Step 106. In Step 114, the result of determination of the aforementioned film developing performance and the photometric value of the negative film 70 are displayed on the CRT 51.

In Step 116, exposure conditions are calculated by using the standard exposure conditions of the aforementioned Formula (1) and the photometric values obtained in Step 110. To evaluate the paper developing performance, an HD or LD measurement region and at least one measurement region between the two densities need to be printed with an identical exposure amount. Accordingly, by using such as the following expression for, for instance, the DM1 and LD:

$$\frac{(a \cdot DM1 + b \cdot LD)}{a + b}$$

and the following expression for the DM2 and HD:

$$\frac{(a \cdot HD + b \cdot DM2)}{a + b}$$

(where a, b are positive coefficients), a weighted average of the DM1 and LD and a weighted average of the DM2 and HD are determined as respective image densities, and the exposure amount is calculated by using the Formula (1) above. It should be noted that fixed exposure conditions stored in advance in the memory may be used as exposure conditions in this case. In Step 118, the images on the negative film are printed on the paper by using the aforementioned exposure conditions, and processing such as development is carried out. In printing, the images may be printed on the paper by changing the exposure amount for the respective images by a fixed amount, e.g. two- or three-fold, with respect to a determined exposure amount for a particular image among the images on the negative film.

In an ensuing Step 120, a determination is made as to whether or not a predetermined time has elapsed since the exposure so as to determined whether or not a print formed by exposure, development, fixing, and drying has reached a photometric position. If it is determined that the print has reached the photometric position, the densities of print images 62P, 64P, 65P, and 66P are measured in Step 122. The white.color plate 32 is photometrically measured before photometrically measuring the print images so as to effect calibration. In an ensuing Step 124, a calculation is made of differences between the photometric values of the HD or MD1, (HD-MD2) or (MD1-LD), and Dmin on the one hand, and their respective reference values on the other, so as to determine the paper developing performance. Specifically, the former photometric values are the photometric value of the printed high density HD or printed medium density MD1, the difference HD-MD2 in which the photometric value of the second medium density MD2 is subtracted from the photometric value of the printed high density HD or the difference MD1-LD in which the photometric value of the printed low density LD is subtracted from the photometric value of the printed first medium density MD1, and the minimum density Dmin obtained from the photometric value of an unexposed portion. If, for instance, the aforementioned differences are ±0.15, it is determined that the case is abnormal, and if they are ±0.10-±0.15, it is determined that a warning is to be issued. The sensitivity and sensitivity balance of the paper can be determined from the printed high density HD and the printed medium density MD1. The variation of the performance can be corrected by correction of the standard exposure conditions of the printer and the correction thereof at this stage is not essential. In an ensuing Step 126, a comparison is made between the photometric value of the printed medium density MD1 or the photometric value of the printed low density LD on the one hand, and a predetermined targeted density on the other. Then, the standard exposure conditions such as the color balance value Cj are corrected in such a manner that the photometric values become the targeted densities, and the corrected photometric values are stored in the memory. In addition, the slope control value Sj is corrected in such a manner that the printed medium density MD2 and the printed high density HD become the targeted densities, and the corrected slope control value Sj is stored in the memory. Subsequently, in Step 128, the aforementioned photometric values, the result of determination, and the corrected result of the standard exposure conditions are displayed on the CRT.

In accordance with the above.described embodiment, the paper developing solution performance can be evaluated by using only a control strip for evaluating the film development without using a control strip for evaluating the paper development. In addition, simultaneously as the performance of both the film developing solution and the paper developing solution is evaluated, the paper quality is evaluated by combining a film image and a paper image, so that it is possible to make an overall determination of the print quality. Furthermore, since the standard exposure conditions are corrected by a print obtained from the control strip for evaluating the film development, properly correcting standard exposure conditions can be set with respect to the film development performance being used. The evaluation of developing solutions using a conventional control strip has been the evaluation of respective solutions and has not been the evaluation of the system as a whole. For that reason, even if the result of such an evaluation deviates from a control limit, the result of evaluation is in many cases accepted and reflected on the prints, thereby leading to the distrust of the evaluation using the control strip. According to this embodiment, a result of evaluation corresponding to actual print quality is obtained.

It should be noted that although in the above.described control strip one pattern is recorded on one image plane, two or more patterns may be formed on one image plane. That is, the low density LD, the medium density MD1, and the high density HD may be recorded on one image plane. Alternatively, the low density LD and the medium density MD1 may be recorded on one image plane, the medium density MD2 and the high density HD may be recorded on another image plane, and the minimum density $D_{min}$ and the desilvering degree.controlling density Y-patch may be recorded on the remaining image planes. Various layouts are conceivable as the patterns provided on the control strip, but the essential point is that two or more density regions are provided, and that at least the tone balance of the negative film and the tone balance of the paper can be examined. This embodiment is applicable not only to a printer-processor but also to a system in which the printer and the paper processor are separated. In addition, this embodiment is also applicable to an apparatus in which the film processor and the printer are integrated and an apparatus having a processor in which the film development and the paper development are partially or wholly made common. It should be noted that although various words or phrases are used in this embodiment such as patterns, images, density measurement regions, and the like, all of them indicate the 60F, 62F, 64F, 65F, 66F, 62P, 64P, 65P, and 66P. These film or print images, whether they be images or patterns, are included in this embodiment insofar as they are provided with uniform, density.measurable areas. In addition, the photometric values include density values.

Figure 5:
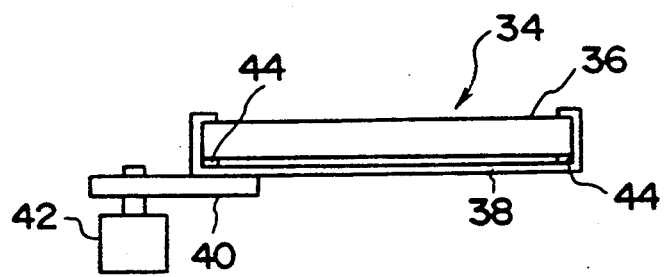
FIG. 5 is a side elevational view of a light-attenuating filter.
Figure 6A:
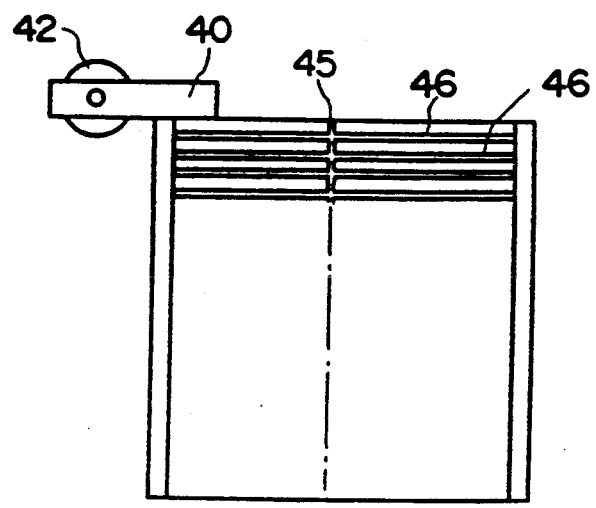
FIG. 6A is a plan view of the light-attenuating filter.
Figure 6B:
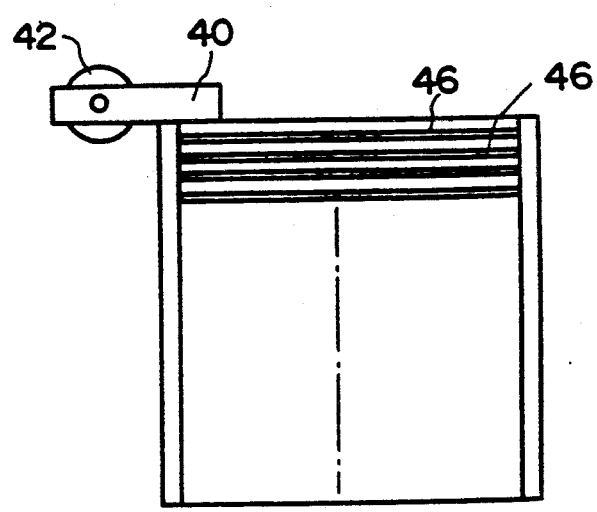
FIG. 6B is a plan view of another example of the light-attenuating filter.

A description will now be given of another example of the light-attenuating filter. As shown in FIGS. 5 and 6A, the light-attenuating filter 34 comprises a glass member 36 and a metallic slit filter 38. It suffices if this light-attenuating filter 34 is disposed between the negative carrier and the light source, preferably between the light-diffusion box and the light source. As the glass member 36, it is possible to use a deposited filter on which a multilayered film is deposited, a white-plate glass filter, or a color-glass filter. The glass member 36 has opposite ends supported by the slit filter 38 whose opposite end portions are bent into a U.shape. A pair of spacers 44 having substantially the same width as that of the bent portion of the slit filter 38 are interposed between the bottom surface of the glass member 36 and the upper surface of the slit filter 38 in such a manner that the two surfaces will not contact each other. These spacers 44 serve to prevent the glass member 36 from becoming damaged as heat is conducted from the slit filter 38 to the glass member 36, and the spacers 44 may be omitted. A mounting arm 40 has one end secured to the vicinity of a corner portion o the slit filter 38. The other end of the mounting arm 40 is secured to a rotating shaft of a motor 42. Accordingly, the rotation of the motor 42 causes the light-attenuating filter 34 to rotate within a horizontal plane about the rotating shaft of the motor 42. A multiplicity of slits 46 of a predetermined width are provided in the entire bottom surface of the slit filter 38 in parallel with each other at predetermined intervals by means of etching or other similar processing. It is preferred that the light transmittance of the slit filter becomes one half or less. That is, it is preferred that the width of the slits 46 is 1.0 mm or less, and the interval between the adjacent ones of the slits 46 is 1.0 mm or more. If the width of the slits becomes large, the interval between the adjacent ones of the slits becomes large, so that the configuration of the light-adjusting filter produces an effect on the printing performance. On the other hand, if the width of the slits is too small, the effect of dust is produced. Accordingly, it is preferable that the slits are as practically wide as possible. Since the light-attenuating filter is disposed in the vicinity of the light source, its temperature becomes high, and the deformation of the slits, in particular, is noticeable owing to the expansion of the metal. In order to prevent the expansion of the metal, it is preferable to provide, for instance, a small-width slit 45 in an orthogonal direction, as shown in FIG. 6A. This small-width slit 45 may be omitted, as shown in FIG. 6B. A plurality of small holes may be provided instead of the slit. The diameter of the holes is set to be 1.5 mm or less, preferably less than 1.0 mm. Both sides of the slit filter 38 is coated in black so as to prevent reflection. In addition, the slit filter 38 may be formed of ceramics, a heat.resistant resin, or the like.

Figure 7:
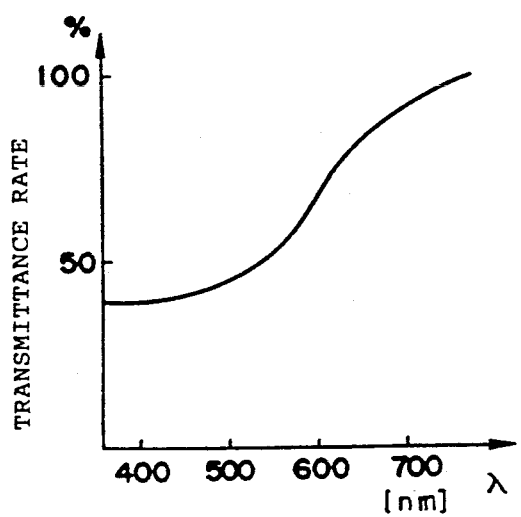
FIG. 7 is a diagram illustrating a characteristics of a glass member.

The glass member 36 is formed such that its transmission distribution becomes a curve such as the one shown in FIG. 7 by such as depositing a multilayered film thereon. Accordingly, the transmission distribution of the light-attenuating filter 34 is greater for the long wavelength band than the short wavelength band. The light-attenuating filter 34 is preferably provided with the average spectral distribution of an average subject for each type of film, but may be provided with the aforementioned characteristic or a flat characteristic.

Figure 8:
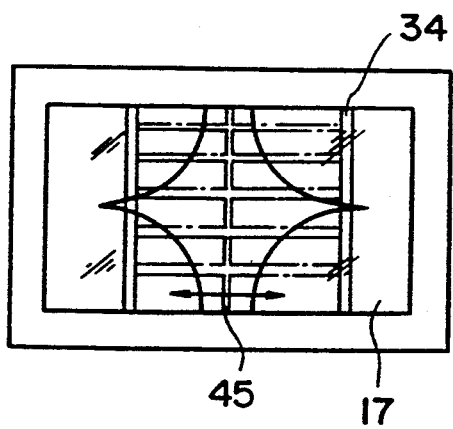
FIG. 8 a plan view illustrating an arrangement of the light-attenuating filter.

As shown in FIG. 8, the above.described light-attenuating filter 34 is disposed in such a manner that the lengthwise direction of the slits 46 in the light-attenuating filter 34 is oriented in the same direction as the moving direction of the light-adjusting filter 17 (the direction indicated by the double.headed arrow in FIG. 8). Thus, since the lengthwise direction of the slits is oriented in the same direction as the moving direction of the light-adjusting filter 17, the amount of light transmitted through the light-attenuating filter 34 changes continuously with the movement of the light-adjusting filter, so that it is possible to prevent the photometric value from changing in steps. In addition, since the slit filter 38 is disposed on the lower side of the glass member 36, it is possible to prevent the slits from becoming loaded with dust, burnt fibers, and the like.

Although in the above.described arrangement the attenuating filter 34 is composed of the glass member 36 and the slit filter 38, the slit filter may be clamped with a pair of deposited filters so as to constitute the light-attenuating filter 34.

Furthermore, if the width of the slits 46 or the diameter of the small holes is 0.3 mm or more, the amount of loading becomes small. If the size of the slits or the small holes is such that dust is unlikely to be loaded therein, the transparent member (glass member) may not necessarily be used with respect to the nontransparent member (slit filter).

A description will now be given of a second embodiment. First, a description will be given of a method of setting a standard value for the color balance value Cj which is one of the standard exposure conditions. The setting of the exposure conditions is effected with the printer-processor set in a standard state and the developing solutions set in a standard state. The light-attenuating filter 34 is retracted from the path of the exposing light, and exposure is effected by using a reference negative film (a bull's eye negative or a negative having conditions allowing a multiplicity of film frames to be printed properly) and by using the above Formula (1) and an automatic exposure correcting function (full correction or high correction) in which the color correction value Aj is set to not less than 1.0, or a value less than 1.0 and close to 1.0. An exposed print is subjected to development, fixing, and drying by the processor section of the printer-processor, thereby producing a print. The image.plane density of this print is measured, and the measured value is set as a targeted density value. This targeted density value is set for each film type by using a reference negative film provided for each film type. Then, the motor 42 is driven to move the light-attenuating filter 34 into the path of the exposing light, and exposure is effected with a full correction or a high correction in accordance with the above Formula (1). Then, a color balance value is determined in such a manner that the image.plane density of the print obtained by that exposure becomes the aforementioned targeted density value, and that value is set as Cj, Subsequently, a color balance value Cj is determined in such a manner that the print density obtained by exposure under the same condition of the full or high correction as described above by using the reference negative becomes the targeted density value. Even if a full or high correction is made, since the characteristics of the reference negative and the characteristics of the light-attenuating filter differ from each other, a characteristic difference $\Delta Cj$ with respect to the primary colors, i.e., R, G, and B, of the reference negative and the light-attenuating filter occurs between the color balance value Cj and the color balance value Cj'. In an ordinary case, exposure is effected by using the color balance Cj, but at the time when control of the standard exposure conditions is effected, the standard exposure conditions are controlled by exposure using the color balance value Cj', and the color balance value Cj, is corrected into the color balance value Cj in correspondence with the characteristic difference $\Delta Cj$. It should be noted that in cases where the spectral characteristic of the light-attenuating filter is approximate to the spectral characteristic of the reference negative film, it suffices if control is effected such that Cj=Cj'.

In addition, although in the foregoing a description has been given of an example in which the targeted density value, the characteristic difference $\Delta Cj$, and the like are determined by photometry, in a case where the standard exposure conditions are set for a plurality of printer-processors of the same model, it suffices if the standard exposure conditions are set as follows: First, since the standard exposure conditions are the same, the targeted density value, the characteristic difference $\Delta Cj$, and the like are determined with respect to a particular printer-processor by photometry. Then, with respect to the remaining printer-processors, the targeted density value, the color balance values Cj, Cj', the characteristic difference $\Delta Cj$, and the like are inputted so as to set the standard exposure conditions.

Next, a description will be given of a method of controlling and maintaining the standard exposure conditions set as described above. Standard values are set in advance as the average image density DNj, the slope control value Sj, and the color balance values Cj, Cj' among the standard exposure conditions. The standard exposure conditions, a targeted density value $PD_{BASE}$, and the like are stored in advance in the memory of the control circuit. This targeted density value is stored for each channel, i.e., for each film type. If a channel is designated, and a switch for correcting the exposure conditions is turned on, a correcting routine shown in FIG. 10 is started, and the lamp of the densitometer 30 lights up in Step 202. The density measurement by the densitometer 30 becomes possible in several dozens seconds after the lamp is lit.

In Step 204, the motor 42 is driven to move the light-attenuating filter 34 into the path of the exposing light. In Step 206, the lamp of the light source section 10 lights up, and the integral transmittance density of the light transmitted through the light-attenuating filter 34 is photometrically measured by the photometer 16. The photometric value obtained by photometry is stored in the memory as Dj. In an ensuing Step 208, the average image density DNj stored in the memory is fetched, and a comparison is made between an absolute value of the difference between the photometric value Dj and the average image density DNj on the one hand, and a predetermined value Do on the other. If $|Dj-DNj| \geq D_0$, it is determined that there has been a change in the light source system owing to such as attachment of dust on the light source section or deterioration of the halogen lamp, so that the average image density DNj is corrected and the corrected DNj is stored in Step 212. In the case of $|Dj-DNj| < D_0$, it is determined that there has been no change in the light source system, and the operation proceeds directly to Step 214.

Figure 9:
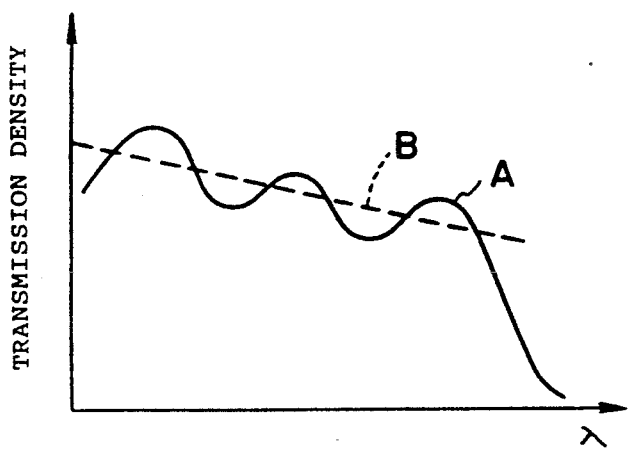
FIG. 9 is a diagram illustrating a difference in characteristics between a reference negative film and the light-attenuating filter.

In Step 214, the color correction value Aj is set a value of 1.0 or more or a value not more than 1.0 and close to 1.0. As a result, the color correction becomes a high or full correction, making it possible to ensure that the effect of remaining two primary colors of the three primary colors on one primary color becomes nil or very small at the time of determining the exposure amount of the three primary colors. The reason for the fact that a high or full correction is thus made is to correct the difference between a characteristic A of a conventional reference negative and a characteristic B of the light-attenuating film 34, as shown in FIG. 9. In an ensuing Step 216, the exposure control value Ej is calculated by setting the color balance value to Cj'and on the basis the above Formula (1) using the corrected DNj. Then, in Step 218, exposure is effected by controlling the light-adjusting filter on the basis of the exposure control value Ej, and development processing of the exposed paper is carried out.

In an ensuing Step 220, by determining whether or not a predetermined time has elapsed since the exposure, a determination is made as to whether or not the print has reached a photometric position. If it is determined that the print has reached the photometric position, the density of the print is measured by the densitometer 30 in Step 222, and the photometric value is stored in the memory as PDj. In Step 224, a targeted density value $PDj_{BASE}$ corresponding to a designated channel is read, and it is determined in Step 226 whether or not an absolute value of the difference between the photometric value PDj and targeted density value $PDj_{BASE}$ of the print is not less than the predetermined value PDo. If $|PDj - PDj_{BASE}| \geq PD_0$, it falls under the case where the targeted density value cannot be obtained despite the fact that correction was made with respect to the change in the light source system in Step 212. Hence, by determining that there has been a change in at least one of the paper and the paper processing system (particularly the developing solution), in Step 228, the slope control value Sj is corrected such that the photometric value PDj becomes the targeted density value $PDj_{BASE}$, and the color balance value Cj is corrected by taking the characteristic difference $\Delta Cj$ into consideration, the results being stored in the memory. As a result, the slope control value and the color balance value are corrected such that the density of the reference print becomes the targeted density, and the printer section as well as the paper and the paper processing system can be corrected separately.

Although in the above a description has been given of an example in which the color balance value Cj for exposure and the like are corrected by using both the targeted density value obtained from a reference negative film and the color balance value Cj' obtained when the light-attenuating filter is used, by operating the automatic exposure correcting function of the printer-processor. However, control may be effected by using the targeted density value obtained from the light attenuating filter as follows: First, appropriate standard exposure conditions are set in the printer-processor by a method using a conventional reference negative film or by a method using the above.described light-attenuating filter. The light-attenuating filter is moved into the path of the exposing light, and the density of a print produced by the automatic exposure correcting function of the printer-processor is set as the targeted density. In the subsequent control after the setting of the targeted density, the color balance value CJ' is corrected and set in such a manner that a print of this targeted density can be obtained under fixed exposure conditions without operating the automatic exposure correcting function. Here, in cases where the spectral characteristic of the light-attenuating filter deviates from the spectral characteristic of the reference negative film (e.g. by ±0.3 or more in terms of a difference in density), the color balance value Cj is corrected by a characteristic difference $\Delta Cj'$ between the light-attenuating filter and the reference negative film so as to obtain a print density close to a more medium gray color. Then, this print density close to the more medium gray color is set as the targeted density. The color balance value for control at this time becomes $Cj' + \Delta Cj'$, an actual print value is set as $Cj = 0$ so as to ensure that a print will be obtained under proper standard exposure conditions.

It should be noted that although in the above a description has been given of an example in which measurement of a change in the light source system, measurement of a change in the paper processing system, setting, control, and maintenance of standard exposure conditions are conducted, measurement of the position of the light-adjusting filter and the amount of light transmitted through the light-adjusting filter may also be conducted. These measurements and settings are included in the setting of copying conditions in accordance with the present invention.

In the case of a printer in which photometry is conducted by dividing a film image into multiple segments, a photometric value is then selected by comparing the photometric values with a reference value, and exposure is controlled by an average density of the selected photometric value, there is no need for setting the exposure conditions for each film type. Therefore, such a printer is suitable as a copying apparatus to which this embodiment is applied.

A description will now be given of a third embodiment. First, a description will be given of a third embodiment. First, a description will be given of a method of setting a standard value for the color balance value Cj which is one of the standard exposure conditions. The setting of the exposure conditions is effected with the printer-processor set in a standard state and the developing solutions set in a standard state. The light-attenuating filter 34 is retracted from the path of the exposing light, and exposure is effected by using a reference negative film (a negative or filter having conditions allowing a multiplicity of film frames to be printed properly) and by using the above Formula (1). An exposed print is subjected to development, fixing, and drying by the processor section of the printer-processor, thereby producing a print. The image-plane density of this print is measured, and the measured value is set as a targeted density value. This targeted density value may be set for each film type by using a reference negative film provided for each film type. Then, the motor 2 is driven to move the light attenuating filter 34 into the path of the exposing light, and exposure is effected in accordance with the above Formula (1). Then, a color balance value is determined in such a manner that the image-plane density of the print obtained by that exposure becomes the aforementioned targeted density value, and that value is set as Cj'. Subsequently, a color balance value Cj is determined in such a manner that the print density obtained by effecting exposure in the same way as described above by using the reference negative becomes the targeted density value. Since the characteristics of the reference negative and the characteristics of the light-attenuating filter differ from each other, characteristic difference $\Delta Cj$ with respect to the primary colors, i.e., R, G, and B, of the reference negative and the light-attenuating filter occurs between the color balance value Cj and the color balance value Cj'. In an ordinary case, exposure is effected by using the color balance Cj, but at the time when control of the standard exposure conditions is effected, the standard exposure conditions are controlled by exposure using the color balance value Cj'. If the color balance value Cj' has undergone a change, the color balance value Cj is corrected in correspondence with the characteristic difference $\Delta Cj$. It should be noted that in cases where the spectral characteristic of the light-attenuating filter is approximate to the spectral characteristic of the reference negative film, it suffices if control is effected such that $Cj = Cj'$.

Figure 11:
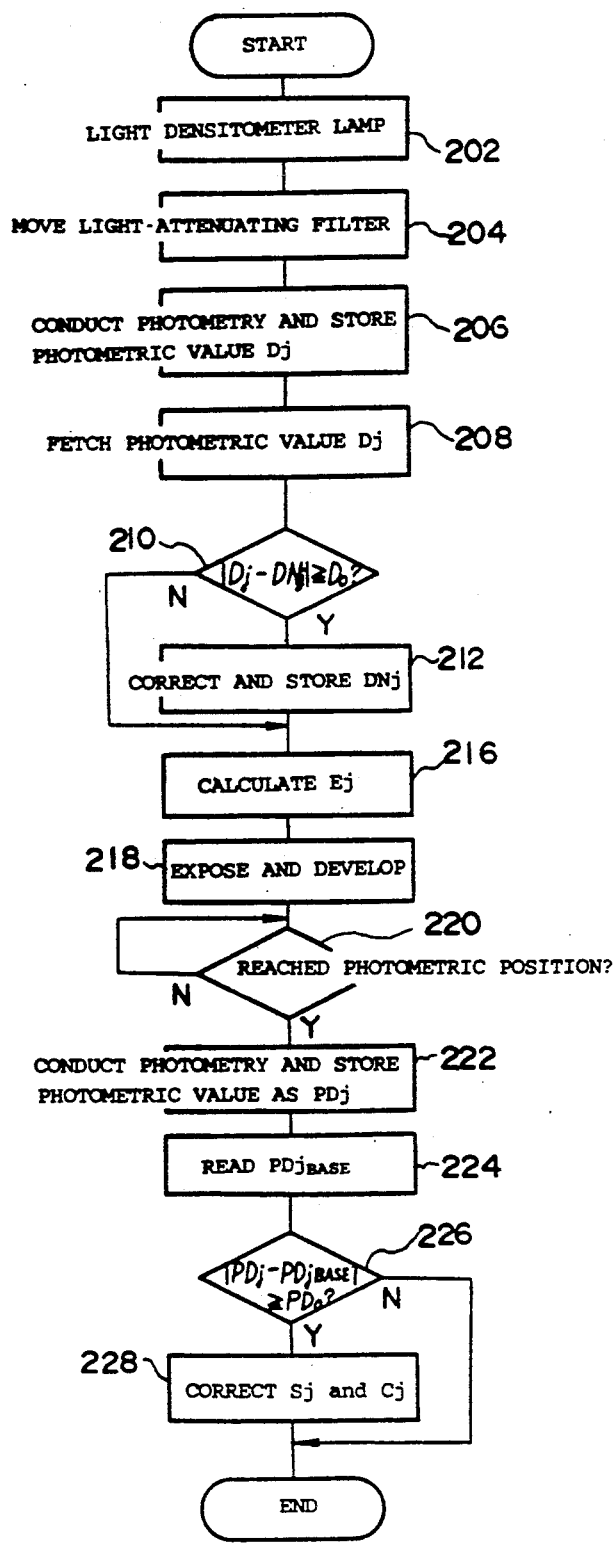
FIG. 11 is a flowchart illustrating another routine for correcting the standard exposure conditions.

Next, a description will be given of a method of controlling the standard exposure conditions set as described above. Standard values are set in advance in the memory of the control circuit 50 as the average image density DNj, the slope control value Sj, and the color balance values Cj, Cj' among the standard exposure conditions. Values of standard exposure conditions and control data such as the targeted density value $PL_{BASE}$, together with a period or a date set in advance in the memory of the control circuit 50, are stored in the control data storage unit 60. This targeted density value is stored for each channel, i.e., for each film type. If a channel is designated, and a switch for correcting the exposure conditions is turned on, a correcting routine shown in FIG. 11 is started, and the lamp of the densitometer 30 lights up in Step 202. The density measurement by the densitometer 30 becomes possible in several dozens seconds after the lamp lights up. It should be noted that since the routine shown in FIG. 11 is substantially similar to the routine shown in FIG. 10, a description will be given by allocating the same reference numerals to corresponding steps.

In Step 204, the motor 42 is driven to move the light-attenuating filter 34 into the path of the exposing light. In Step 206, the lamp of the light source section 10 lights up, and an image-plane average density of the light transmitted through the light attenuating filter 34 is photometrically measured by the photometer 16. The photometric value obtained by photometry, together with the date, is stored in the control data storage unit as Dj. In an ensuing Step 208, the average image density DNj stored in the memory is fetched, and a comparison is made between an absolute value of the difference between the photometric value Dj and the average image density DNj on the one hand, and a predetermined value $D_0$. If $|Dj - DNj| \geq D_0$, it is determined that there has been a change in the light source system owing to such as attachment of dust on the light source section or deterioration of the halogen lamp 12, so that the average image density DNj is corrected and the corrected DNj, together with the date, is stored in Step 212. In the case of $|Dj - DNj| < D_0$, the operation proceeds to Step 214. At this time, data indicating that there has been no change is stored together with the date.

In an ensuing Step 216, the exposure control value Ej is calculated by setting the color balance value to Cj' and on the basis the above Formula (1) using the corrected DNj. Then, in Step 218, exposure is effected by controlling the light-adjusting filter on the basis of the exposure control value Ej, and development processing of the exposed paper is carried out. Values of the standard exposure conditions at that time or some of those values are together with the date stored in the control data storage unit 60.

In an ensuing Step 220, by determining whether or not a predetermined time has elapsed since the exposure, a determination is made as to whether or not the print has reached a photometric position. If it is determined that the print has reached the photometric position, the density of the print is measured by the densitometer 30 in Step 222, and the photometric value, together with the date, is stored in the control data storage unit 60 as PDj. In Step 224, a targeted density value $PDj_{BASE}$ corresponding to a designated channel is read, and it is determined in Step 226 whether or not an absolute value of the difference between the photometric value PDj and targeted density value $PDj_{BASE}$ of the print is not less than the predetermined value PDo. If $|PDj-PDj_{BASE}| PD_0$, it falls under the case where the targeted density value cannot be obtained despite the fact that correction was made with respect to the change in the light source system in Step 212. Hence, by determining that there has been a change in at least one of the paper and the paper processing system (particularly the developing solution), in Step 228, the slope control value Sj is corrected such that the photometric value PDj becomes the targeted density value $PDj_{BASE}$, and the color balance value Cj is corrected by taking the characteristic difference $\Delta Cj$ into consideration, the results being together with the date stored in the control data storage unit 60. As a result, the slope control value and the color balance value are corrected such that the density of the reference print becomes the targeted density, and the printer section as well as the paper and the paper processing system can be corrected separately. Although in the above a description has been given of an example in which automatic detection and photometry are effected by using the light-attenuating filter, this embodiment is applicable to a case where detection and photometry are effected manually.

Figure 12:
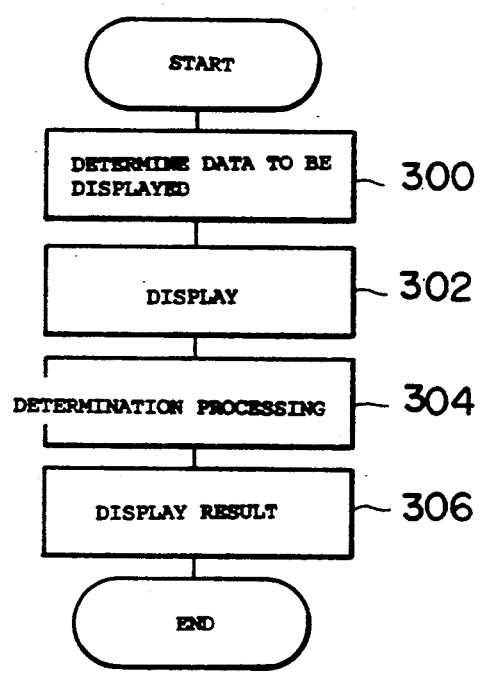
FIG. 12 is a flowchart illustrating a control routine.

If the contents of the data to be displayed are designated by operating a keyboard and a control switch is pressed, a routine shown in FIG. 12 is started. In Step 300, the data to be displayed are discriminated, and the data discriminated are outputted from the control data storage unit 60, the data being displayed on the CRT in a time series. As a displaying method, it suffices if, for instance, a time axis is plotted as the abscissa and the data are plotted as the ordinate. The display of the data varies depending on a purpose, and the display may be given in the form of a control chart, a histogram, a cumulative distribution diagram, a color coordinate diagram, a table, or a graph. In an ensuing Step 304, a determination is made of a tendency of the change in the data displayed by determination processing such as statistical processing, and the result of determination is displayed on the CRT in Step 306. As for the result of determination, after making a comparison between a reference value and the value obtained by determination processing by such as statistical processing, a caution, warning, abnormality, countermeasure, or other similar result is displayed. In the determination processing in Step 304, instead of using the statistical processing, the situation may be determined by using an expert system, fuzzy theory, neural network or the like in which determining procedures of skilled control personnel are incorporated as software. In addition to the data displayed, other control data indicating the situation of the printer-processor is preferably used in the aforementioned determination so as to effect an overall determination.

Although in the above a description has been given of an example in which the color balance value Cj for exposure and the like are corrected by using both the targeted density value obtained from a reference negative film and the color balance value Cj' obtained when the light-attenuating filter is used, by operating the automatic exposure correcting function of the printer-processor. However, control may be effected by using the targeted density value obtained from the light-attenuating filter as follows: First, appropriate standard exposure conditions are set in the printer-processor by a method using a conventional reference negative film or by a method using the above.described light-attenuating filter. The light-attenuating filter is moved into the path of the exposing light, and the density of a print produced by the automatic exposure correcting function of the printer-processor is set as the targeted density. In the subsequent control after the setting of the targeted density, the color balance value Cj' is corrected and set in such a manner that a print of this targeted density can be obtained under fixed exposure conditions without operating the automatic exposure correcting function. Here, in cases where the spectral characteristic of the light-attenuating filter deviates from the spectral characteristic of the reference negative film (e.g. by $\pm 0.3$ or more in terms of a difference in density), the color balance value Cj' is corrected by a characteristic difference $\Delta Cj'$ between the light-attenuating filter and the reference negative film so as to obtain a print density close to a more medium gray color. Then, this print density close to the mcre medium gray color is set as the targeted density. The color balance value for control at this time becomes $Cj' + \Delta Cj'$, an actual print value is set as $\Delta Cj = 0$ so as to ensure that a print will be obtained under proper standard exposure conditions.

It should be noted that although in the above a description has been given of an example in which measurement data on a change in the light source system, measurement data on a change in the paper processing system, and data on the setting of standard exposure conditions are stored in the control data storage unit as control data, the following data may also be stored as control data: the position of the light-adjusting filter, measurement data on the amount of light transmitted through the light-adjusting filter, the temperature of the developing solution, pH, specific gravity, the temperature of the drying section, and control strip measuring data for examining the performance of the developing section, as well as the time duration of the lamp being lit, printing time, the state of use including the number of prints, film characteristics such as the density of the film printed and contrast, the situation of occurrence of an abnormality or warning, and changes with time of equipment and materials. Incidentally, old data among the control data may be sequentially deleted or summarized.

Although in the above a description has been given of an example in which control is effected by using the light-attenuating filter, in a case where control is effected by using a conventional film for evaluating film development, paper for evaluating paper development, and reference film in which a standard subject has been photographed, the method of this embodiment can also be used in a similar manner although detection values and set data to be set differ slightly. In addition, in a case where the aforementioned printer-processor and a film developing apparatus are used in combination, the two equipment may be controlled by a common control device by adding control data of the film developing apparatus. A period for storing the control data in the storage unit may be either a time or a frequency. In addition, the data need not be stored on each occasion of detection or photometry, and may be stored at fixed times, at fixed intervals, or at the time of occurrence of a change of a specific state, through human keying, at a time of a specific operation, and at a time of a specific situation. Additionally, although this embodiment has been described with respect to the printer-processor, this embodiment is also applicable to other copying apparatus such as a color copying machine, a laser printer, and an image processor.

A description will now be given of a fourth embodiment of the invention with reference to the drawings.

Figure 13:
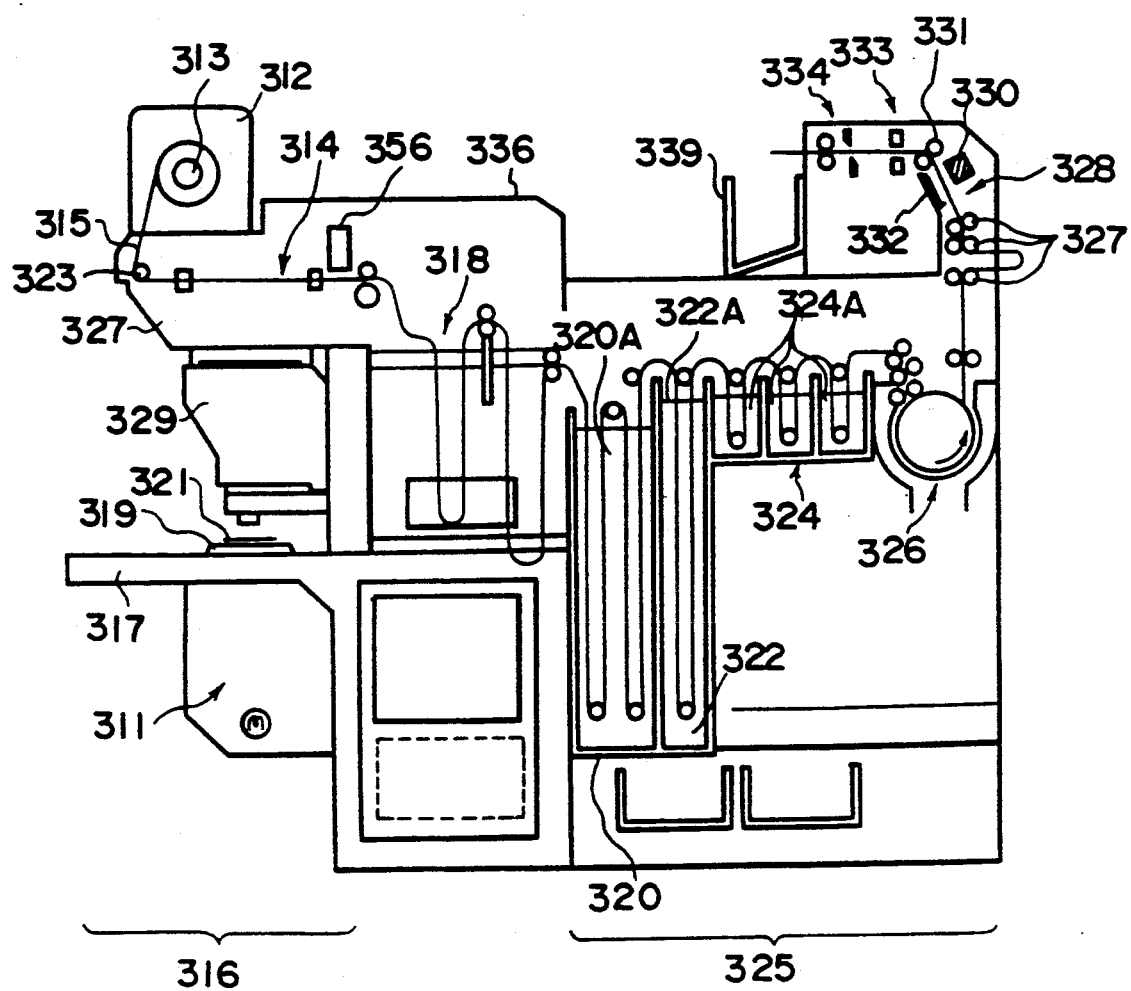
FIG. 13 is a schematic diagram of a printer-processor in accordance with a fourth embodiment.

FIG. 13 shows another printer-processor which is a type of copying apparatus in accordance with the present invention. The exterior of the printer-processor is covered with a casing 336. The printer-processor has a working table 317 projecting from the casing 336. A negative carrier 319 on which a negative film 321 is set is placed on the upper surface of the working table 317.

Disposed below the working table 317 is a light source section 311 constituting a part of a copying section 316. The light source section 311 has a light source and a plurality of filters (neither are shown). The arrangement provided is such that a light beam emitted from the light source reaches the negative film 321 set on the negative carrier 319 via the plurality of filters. Incidentally, the light-attenuating filter 34 described above may be adopted in this arrangement as well.

An optical system 329 constituting a part of the copying section 316 is attached to an arm portion 327 projecting from the printer-processor. The optical system 329 has a lens and a shutter (neither are shown) and is disposed on the optical axis of the light beam. THe light beam transmitted through the negative film 321 passes through the lens and the shutter, and allows an image on the negative film 321 to be formed on ac olor print paper 315 set in an exposure chamber 314. As a result, the image on the negative film 321 is copied onto the color print paper 315.

Figure 15:
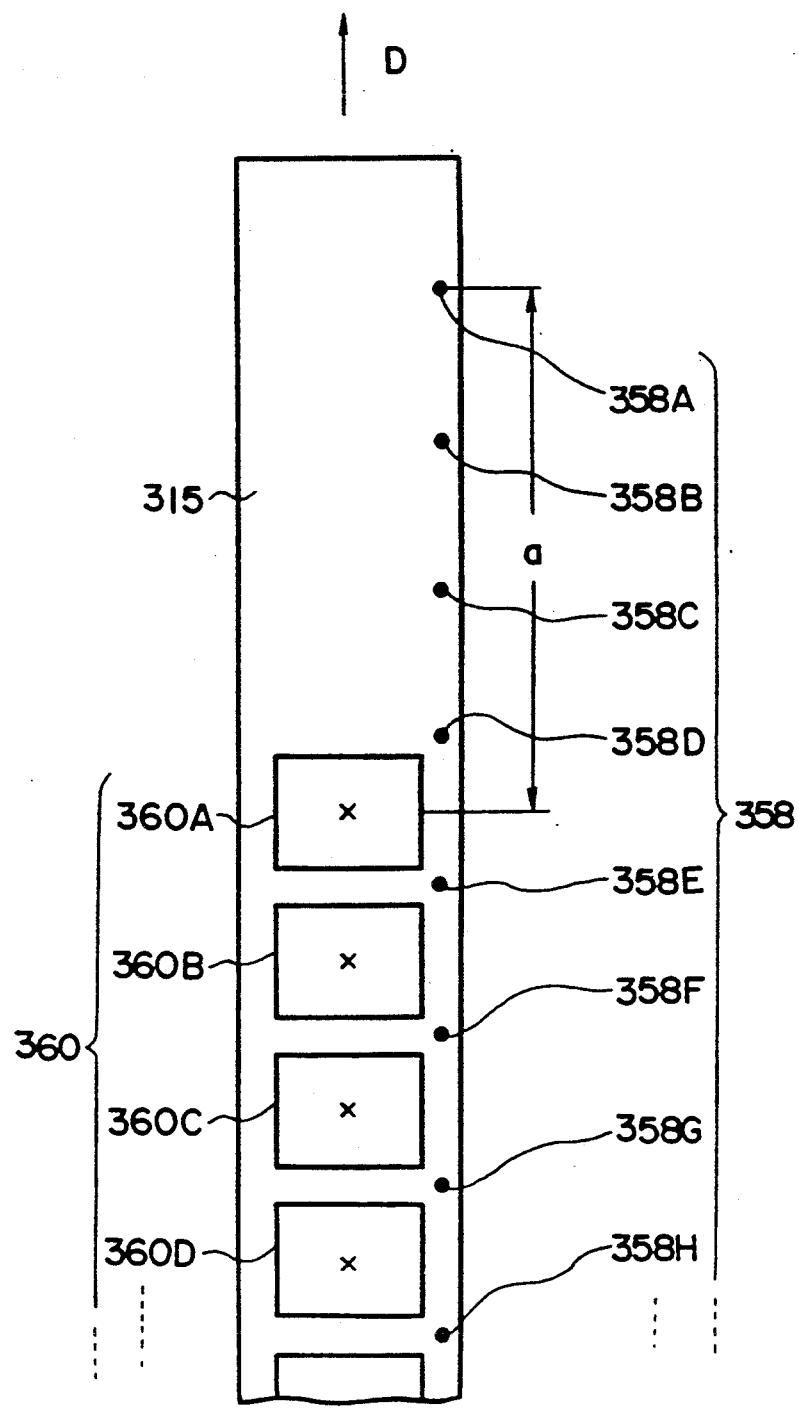
FIG. 15 is a plan view illustrating a color print paper in accordance with the fourth embodiment.

Mounted above the arm 327 is a paper magazine 312 for accommodating the elongated color print paper 315, i.e., a copying photosensitive material, after taking up the paper 315 onto a reel 313 into the form of a roll. A riller 323 is disposed in the arm portion 327 so as to transport the color print paper 315 to the exposure chamber 314. Then, the paper 315 onto which the image on the negative film 321 has been printed in the exposure chamber 314 is transported to a reservoir section 318 adjacent the exposure chamber 314. A puncher 356 which is a mark imparting means is disposed between the exposure chamber 314 and the reservoir section 318. The puncher 356 punches holes in the color print paper 315 as marks to be imparted thereto. The puncher 356 is disposed such that the distance between a position for punching holes in the color print paper 315 and a position for exposing an image inside the exposure chamber 314 becomes a, as shown in FIG. 15. Each time an image 360 is copied on the color print paper 315 in the exposure chamber 314, the puncher 356 simultaneously punches a hole in the paper 315. As a result, as shown in FIG. 15, a hole 358A correspondign to an image 360A is punched at a position spaced apart the distance a from a density-measuring portion of the image 360 downstream in the direction of travel of the paper. It should be noted that in FIG. 15 the direction of arrow D denotes the direction of travel of the paper 315, and "⊻" denotes the density-measuring portion. In addition, with respect to the other images 360B, 360C, and 360D as well, holes 358B, 358C, and 358D corresponding to respective images are similarly punched at the distance a, respectively.

In FIG. 13, the reservoir section 318 stockes the already printed paper 315 and absorbs a difference in processing time between the copying section 316 for effecting printing and a processor section 325 for effecting various processing including development, fixing, and washing. The color print paper 315 discharged from the reservoir section 318 is transported to a color development section 320 adjacent the reservoir section 318. The color development section 320 effects development by immersing the color print paper 315 in a developing solution 320 A. The developed paper 315 is transported to a bleach-fixing section 322 adjacent the color development section 320. The bleach-fixing section 322 effects fixing by immersing the paper 315 in a fixing solution 322A. The fixed paper 315 is transported to a rinsing section 324 adjacent the bleach-fixing section 322. The rinsing section 324 effects washing by immersing the paper 315 in cleanign water 324A. The washed paper 315 is transported to a drying section 326 adjacent the rinsing section 324. The drying section 326 dires the paper 315 by winding it around a roller and allowing it to be exposed to high-temperature air.

Figure 14:
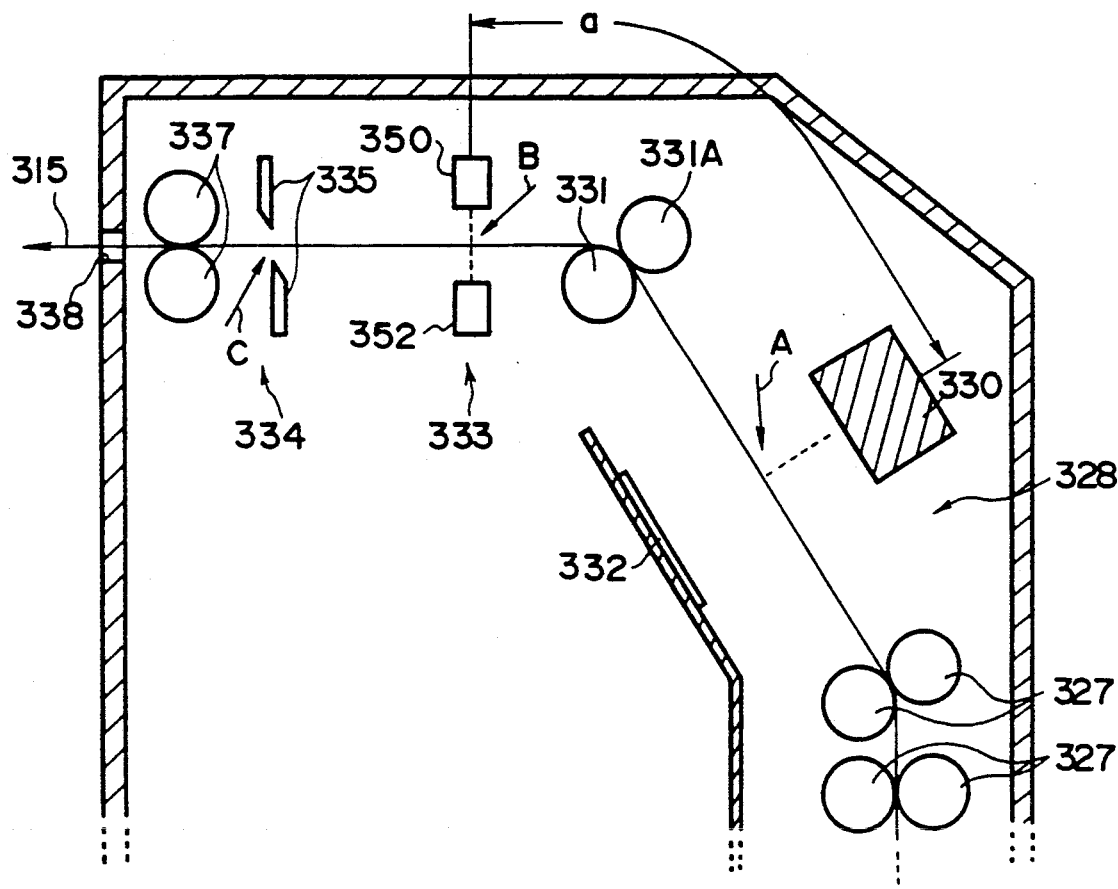
FIG. 14 is a schematic cross.sectional view of a density measuring section and components located in its vicinity.

The color print paper 315 which has passed through the drying section 326 is guided by a plurality of pairs of rollers 327 and transported to a density measuring section 328 disposed above the drying section 326. As shown in FIG. 14, the density measuring section 328 comprises a densitometer 330 and a reference print 332 having a reference density. The densitometer 330 and the reference print 332 are disposed in face-to-face relationship with each other. The densitometer 330 is connected to a controller 340. The densitometer 330 measures the density of the color print paper 315 at a measuring position (the position indicated by arrow A in FIG. 14) on the transporting path as well as the density of the reference print 332, and outputs the measured densities to the controller 340. The paper 315 is then transported between the densitometer 330 and the reference print 332.

Figure 16:
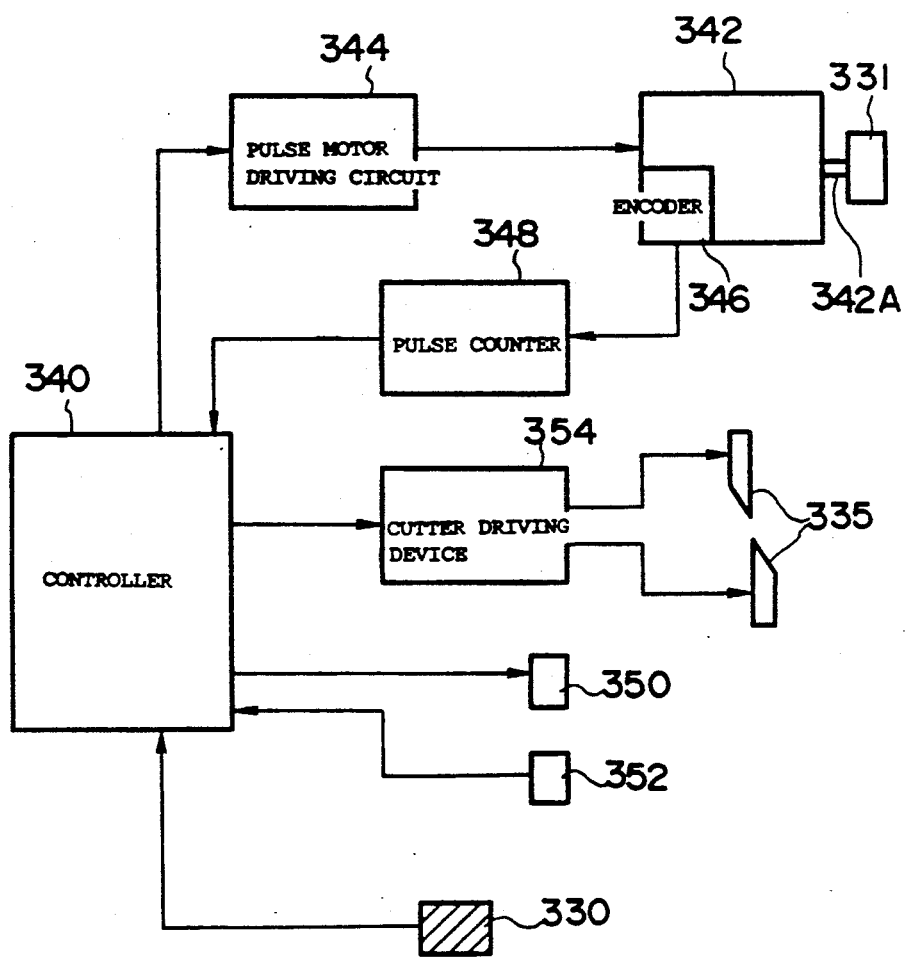
FIG. 16 is a block diagram illustrating the connection of the density measuring section and components located in its vicinity.

A transport roller 331 and a roller 331A are disposed downstream of the density measuring section 328 in the direction of travel of the paper. As shown in FIG. 16, the transport roller 331 is affixed to a rotating shaft 342A of a pulse motor 342 and rotates as a driving force of the pulse motor 342 is transmitted thereto, thereby transporting the paper 315 while clamping the same. The pulse motor 342 is connected to the controller 340 via a pulse motor driving circuit 344, and its drive is controlled by the controller 340. In addition, the pulse motor 342 incorporates an encoder 346 for converting the amount of rotation of the rotating shaft 342A to a number of pulses. The encoder 346 is connected to the controller 340 vi a pulse counter 348 for integrating the number of pulses outputted by the encoder 346. As a result, the controller 340 is capable of detecting the amount of rotation of the rotating shaft 342A of the pulse motor 342, i.e., the transported distance of the paper 315.

As shown in FIG. 14, disposed downstream of the densitometer 330 in the direction of travel of the paper is a punched-hole detecting section 333 which is a mark detecting means. The punched-hole detecting section 333 comprises a light-emitting element 350 and a light-receiving element 352 that are disposed in such a manner as to face each other with the paper transporting path located therebetween. The position where the light-emitting element 350 and the light-receiving element 352 are located, i.e., the punched-hole detecting position of the punched-hole detecting section 333 (the position indicated by arrow B in FIG. 14), and the measuring position of the density measuring section 328 are spaced apart from each other the distance a along the paper transporting path. The light-emitting element 350 and the light-receiving element 352 are respectively connected to the controller 340 (see FIG. 16). The light-emitting element 350 issues a beam of light toward the light-receiving element 352, while the light-receiving element 352 receives the beam of light, converts it to an electrical signal and outputs it to the controller 340. When the magnitude of the electrical signal outputted from the light-receiving element 352 is a predetermined value or higher, the controller 340 determines that the punched hole has been detected.

A cutter section 334 is disposed downstream of the punched-hole detecting section 333 in the direction of travel of the paper. The cutter section 334 comprises a pair of cutters 335 for cutting the color print paper, a cutter driving device 354 (see FIG. 16) for actuating the cutters 335, and a pair of rollers 337. The pair of cutters 335 are disposed in face.to.face relationship with each other with the paper transporting path located therebetween. The cutter driving device 354 is connected to the controller 340 and its operating timing is controlled by the controller 340. The cutter section 334 cuts the color print paper 315 at a cutting position (the position indicated by arrow C in FIG. 14) on the paper transporting path by being controlled by the controller 340. The color print paper 315 thus cut is clamped by the pair of rollers 337 and is discharged to a paper receiving box 339 disposed on the outer side of the casing 336 via an opening 338 (see FIG. 13).

In addition, the controller 340 converts to a number of pulses the distance between a cutting portion of the image 360 (near an edge portion of the image 360) and a cutting position of the cutter section 334 with the density-measuring portion of the image 360 positioned at the measuring position of the density measuring section 328, and the controller 340 stores the converted data as a number of pulses N.

A description will now be given of the operation of this embodiment.

A user of the printer-processor sets the paper magazine 12 with the color print paper 315 loaded therein, sets the negative film 321 on the negative carrier 319, and presses a start button for starting the processing operation by the printer-processor.

Upon the start of processing, the light source of the light source section 311 lights up, and the copying section 16 effects the positioning of the negative film 321. Then, an exposure amount is calculated, the filter of the light source section 311 is moved on the basis of the exposure amount, and the shutter of the optical system 329 is opened. As a result, the light beam issuing from the light source is transmitted through the filter and the negative film 321 to expose the color print paper 315 positioned at an exposing position in the exposure chamber 314. Consequently, an image on the negative film is printed on the paper 315. At this time, the puncher 356 is actuated simultaneously. Thus, a hole 358 corresponding to each image 360 is punched at a position of the paper 315 spaced apart the distance a from the density-measuring portion of each copied image 360. The paper 315 punched with the holes 358 is transported to the reservoir section 318.

The color print paper 315 on which an image has been printed in the copying section 316 is provided with various processing in the processor section 325. That is, the paper 315 transported from the reservoir section 318 is immersed in the developing solution 320A in the developing section 320 to undergo development. The paper 315 thus developed is transported to the bleach-.fixing section 322 to undergo fixation processing. The paper 315 thus fixed is transported to the rinsing section 324 to undergo washing. The paper 315 washed is then transported to the drying section 326 to undergo drying.

Figure 17:
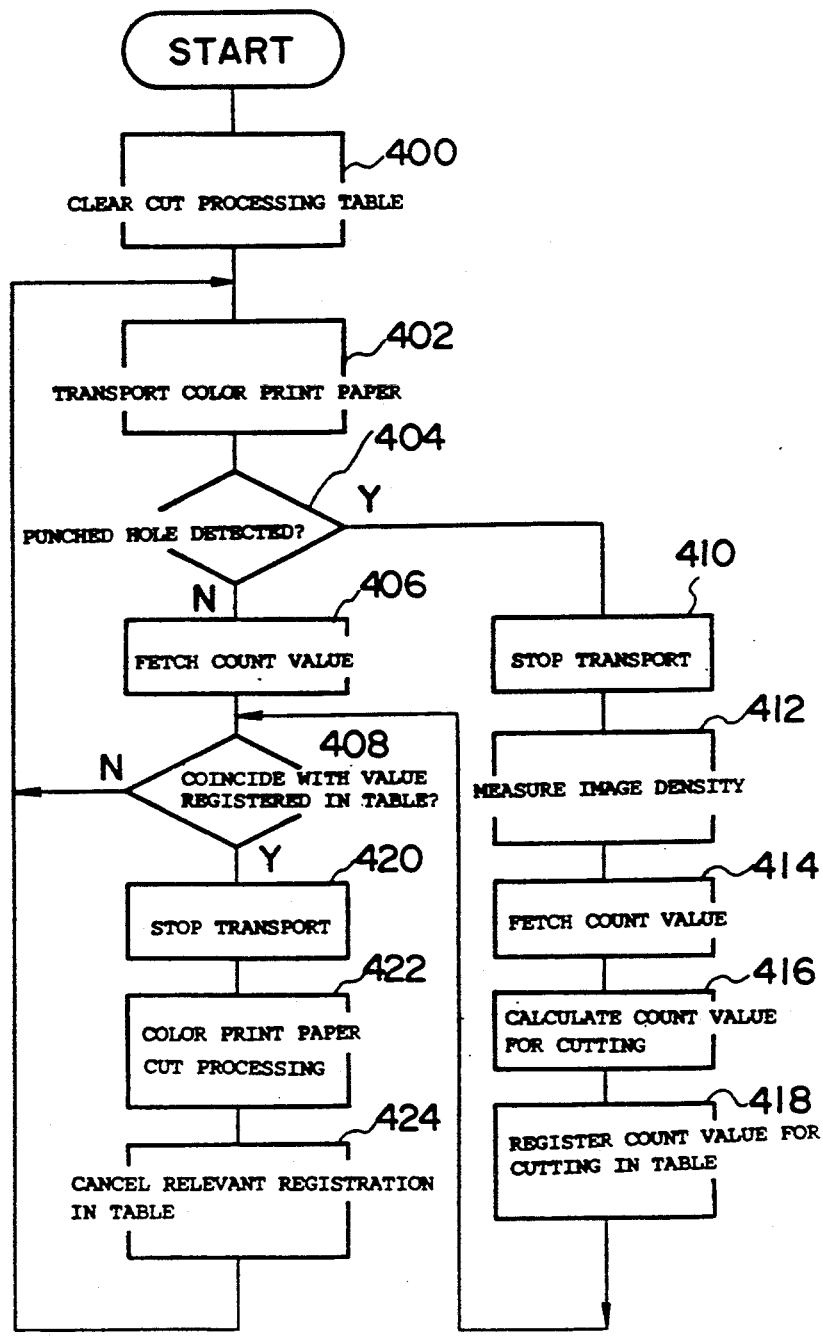
FIG. 17 is a flowchart illustrating operation in accordance with the fourth embodiment.

The paper 315 which has undergone drying is transported consecutively to the density measuring section 328, the punched-hole detecting section 333, and the cutter section 334. The operation in the density measuring section 328, the punched-hole detecting section 333, and the cutter section 334 will be described hereafter with reference to a routine shown in FIG. 17.

In Step 400, a cut processing table is cleared. In the cut processing table, a plurality of timings for effecting cut processing, i.e., timings for actuating the cutter section 334, are registered in the form of counts of the number of pulses. In an ensuing Step 402, the pulse motor 342 is driven to transport the paper 315. In Step 404, from an output signal from the light-receiving element 352 of the punched-hole detecting section 33, a determination is made as to whether or not the punched hole 358 in the paper 315 has been detected.

If it is determined that the punched hole 358 has been detected, the density measurement and registration of the cut processing table are effected in Steps 410 to 418. That is, in Step 410, the transport of the paper 315 is stopped. Then, in Step 412, the density of the image 360 on the paper 315 is measured. In this embodiment, the distance between the density-measuring portion of the image 360 and the punched hole 358 corresponding to the image 360 as well as the distance between the measuring position of the density-measuring section 328 and the punched-hole detecting position of the punched-hole detecting section 333 are set to be the fixed distance a. Accordingly, at the point of time when the punched hole is detected, the density-measuring portion of the image on the paper 315 is located at the measuring position of the density measuring section 328. Accordingly, if the transport is stopped at the point of time when the punched hole is detected, the density measuring section 328 is capable of measuring the density of the image 360 positioned at the measuring position.

Next, in Step 414, a count value S representing the number of pulses of the pulse counter 348 is fetched. In Step 416, a calculation is made of an arithmetic value C of the number of pulses indicating the count value of the pulse counter 348 when the cutting portion of the image 360, whose density has been measured in Step 412, is positioned at the cutting position. This arithmetic value C can be derived from a sum of the number of pulses N stored in advance in the controller 340 and the count value S fetched in Step 14. A state in which the count value S of the pulse counter 348 is equal to the arithmetic value C of the number of pulses thus obtained corresponds to a timing for effecting cut processing. In Step 418, the arithmetic value C of the number of pulses is registered in the cut processing table, and the operation proceeds to Step 408.

On the other hand, if the punched hole 358 is not detected in Step 404, the count value of the number of pulses counted by the pulse counter 348 is fetched in Step 06, and the operation proceeds to Step 408.

In Step 408, a determination is made as to whether or not the count value of the number of pulses fetched in Step 14 or 416 has been registered in the cut processing table. If NO is the answer, the operation returns to Step 402.

If YES is the answer in Step 408, the transport of the paper 315 is stopped in Step 420. In this state, the cutting portion of the image 360 is positioned in the cutting position. Then, in Step 422, the cutters 335 are actuated via the cutter driving device 354 to cut the paper 315 into image units. In Step 424, the relevant registration in the cut processing table is canceled, and the operation returns to Step 402.

Thus, in this embodiment, since the distance between the density-measuring portion of the image 360 and the punched hole 358 corresponding to the image 360 as well as the distance between the measuring position of the density measuring section 328 and the punched-hole detecting position of the punched-hole detecting section 333 are set to be the fixed distance a. it suffices to effect the measurement of the density of the image 360 when the punched-hole detecting section 333 has detected the punched hole 358. Hence, the positioning of the image 360 at the measuring position of the density measuring section 328 can be effected simply and accurately.

In addition, since the positioning of a density-measuring portion at the measuring position of the density-measuring section 328 and the positioning of a cutting portion at the cutting position of the cutter section 334 are effected based on the detection timing of the punch hole by the punched-hole detecting section 333, it is unnecessary to newly provide a detecting means for positioning the image at the density measuring section 328. Hence, the arrangement of the printer-processor is simplified.

Furthermore, with the printer-processor in accordance with the present invention, in cases where a color print paper with an image already printed thereon, such as a control strip, is inserted directly into the paper transporting path of the processor section 325 to effect processing, if the hole 358 is punched in advance in the color print paper, the density measurement and cut processing can be effected in the same way as the color print paper 315 which is printed by the printer-processor.

Figure 18:
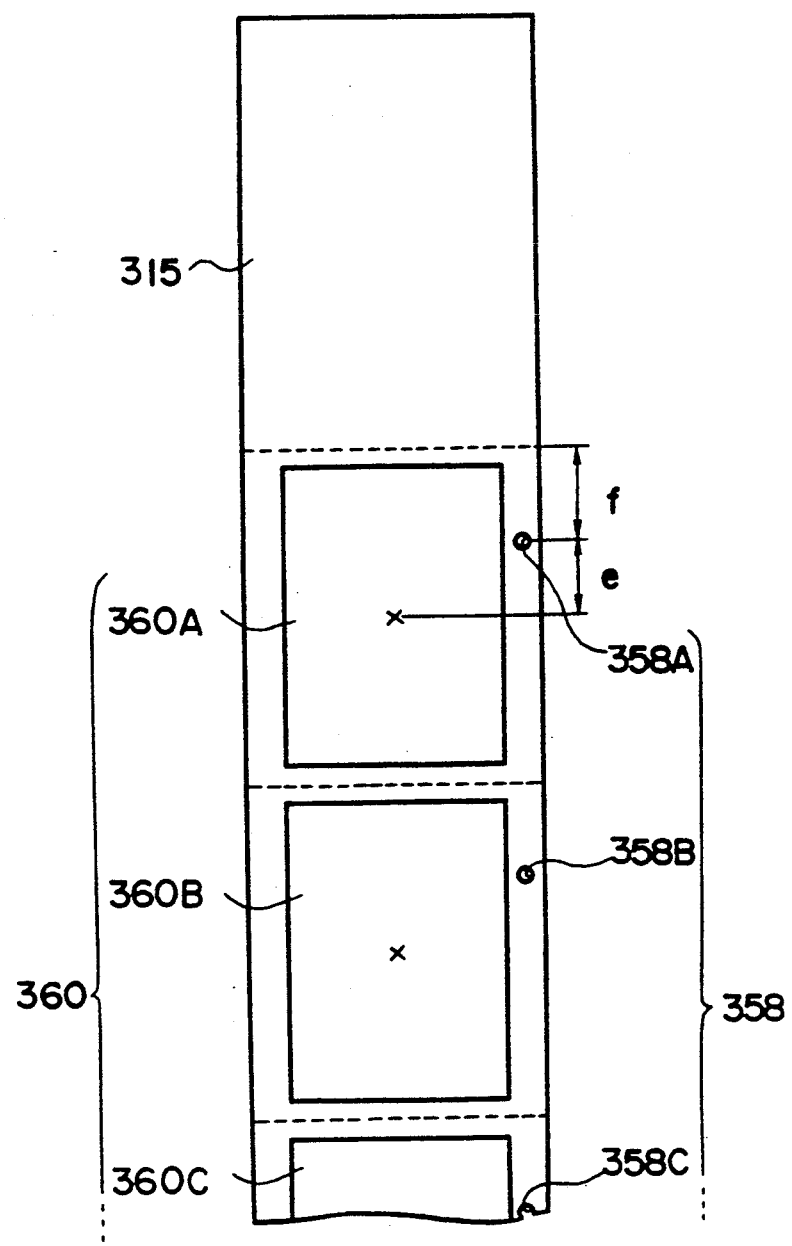
FIG. 18 is a plan view illustrating the color print paper in accordance with a fifth embodiment.

Although in this embodiment the density of the image 360 is measured when the punched hole is detected, and after the color print paper 315 is transported a predetermined distance, the color print paper 315 is subjected to cut processing, the density measurement and cut processing may be effected simultaneously when the punched hole is detected as in a fifth embodiment which will be described hereafter. As shown in FIG. 18, the punched hole 358 corresponding to the image 360 may be provided between a density-measuring portion (indicated by "⊥") of the image 360 and a cutting portion (indicated by a broken line) of the image 360. If the distance between the density-measuring portion on the paper 315 and the punched hole is set to be e, and the distance between the punched hole and the cutting portion is set to be f, it is sufficient to dispose the density measuring section 328, the punched-hole detecting section 333, and the cutter section 334 such that the measuring position and the detecting position are spaced apart from each other the distance e along the transporting path, and that the detecting position and the cutting position are spaced apart from each other the distance f. By virtue of this arrangement, when the punched hole is detected by the punched-hole detecting section 333, the density-measuring portion of the image 360 is positioned at the measuring position, and the cutting portion of the image 360 is positioned at the cutting position, so that the density measurement and cut processing can be effected simultaneously.

In addition, with this embodiment, the puncher 356 is used as the mark imparting means and the punched holes 358 are punched in the color print paper 315. However, the marks imparted to the color print paper are not restricted to the punched holes, and notches of an arbitrary configuration such as a semicircular or wedge.shaped configuration may be provided at a side edge of the paper 315, or marks may be printed together with the image onto the paper 315 when exposure processing is effected. Alternatively, the marks may be printed on the rear surface of the paper 315.

Although in this embodiment each mark is imparted on the downstream side of the image in the direction of travel of the paper, and the density measuring section 328 is disposed such that the measuring position is located on the upstream side of the punched-hole detecting position in the direction of travel of the paper, as described above. However, this embodiment is not restricted by this arrangement, and each mark may be imparted on the upstream side of the image in the direction of travel of the paper, and the density measuring section 328 may be disposed such that the measuring position is located on the downstream side of the punched-hole detecting position in the direction of travel of the paper. In this case, if the distance between the image and the mark corresponding thereto is set to be identical with the distance between the detecting position and the measuring position, the image will be located at the measuring position when the mark is detected, as in the case of this embodiment, so that the positioning of the image at the measuring position is not needed.

Although in this embodiment the distance between the exposing position in the exposure chamber 314 and the punching position of the puncher 356 is set to be identical with the distance between the measuring position of the density measuring section 328 and the punched-hole detecting position of the punched-hole detecting section 333, the two distances may not be identical. For instance, in a case where the distance between the measuring position of the density measuring section 328 and the punched-hole detecting position of the punched-hole detecting section 333 is smaller than the distance between the exposing position in the exposure chamber 314 and the punching position of the puncher 356, an arrangement may be provided such that the difference between the two distances is stored in advance in the controller 340, and after detection of the punched hole the color print paper 315 is transported in correspondence with the just.mentioned difference before the density measurement is made.

Furthermore, an arrangement may be alternatively provided as follows: The number of holes to be punched by the puncher 356 is restricted to at least one, and the distances between the punched hole and a plurality of exposing positions for exposure in the exposure chamber 314 are stored in advance in the controller 340. Additionally, the distance between the measuring position of the density measuring section 328 and the punched-hole detecting position of the punched-hole detecting section 333 is also stored in advance. After the punched hole is detected, the transport of the color print paper and the density measurement are repeated by using the aforementioned two kinds of distance data, thereby making it possible to effect the density measurement of a plurality of images by means of at least one punched hole.

Figure 19:
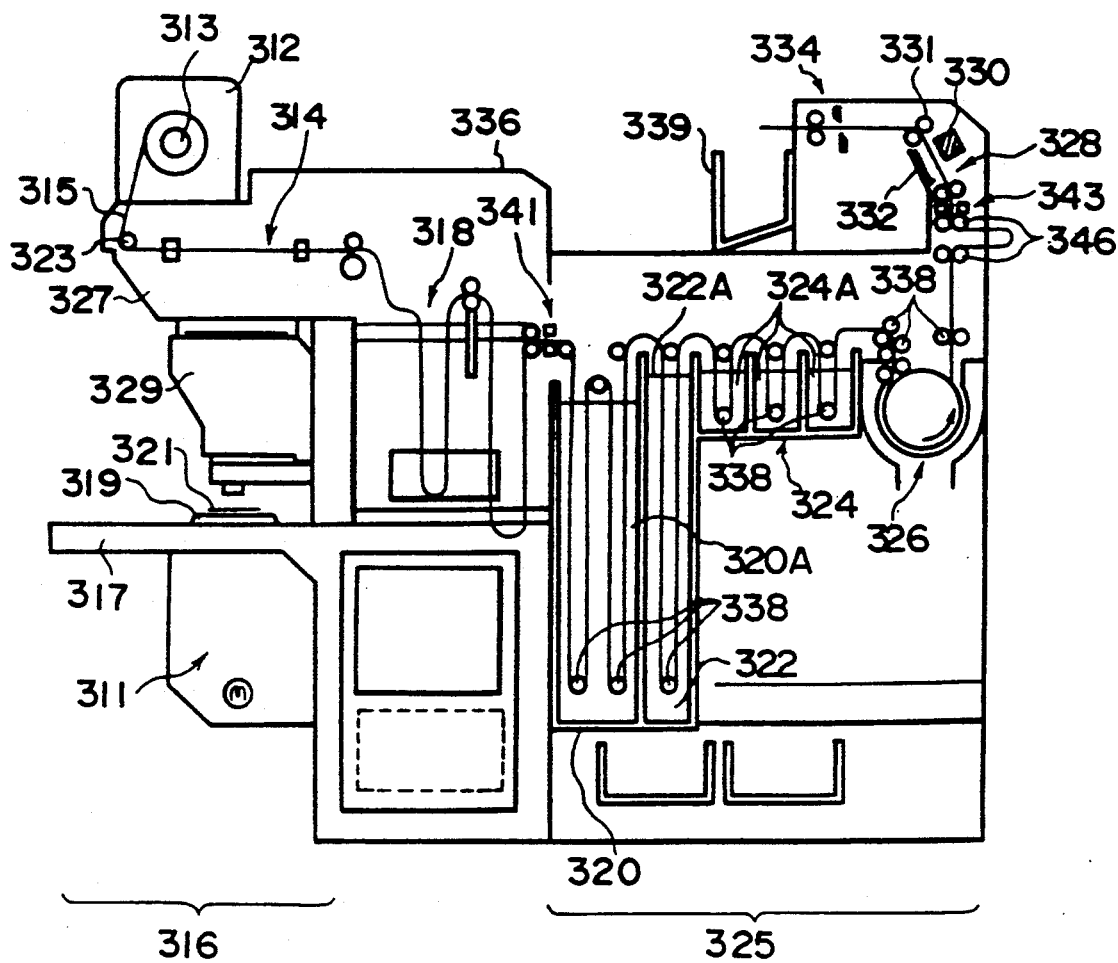
FIG. 19 is a schematic diagram of a printer-processor in accordance with a sixth embodiment.
Figure 23:
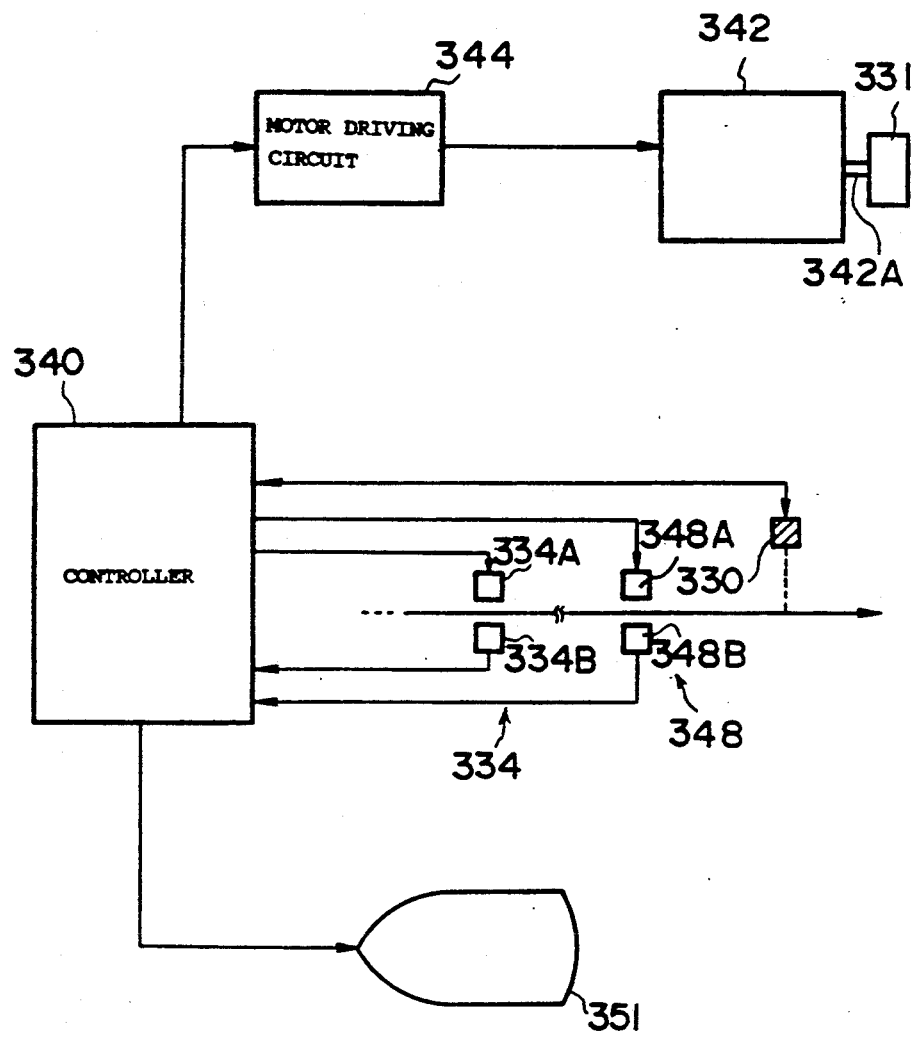
FIG. 23 is a schematic block diagram in accordance with the sixth embodiment.

A description will now be given of a sixth embodiment. It should be noted that components or portions corresponding to those of the foregoing embodiments are denoted by the same reference numerals, and a description thereof will be omitted. As shown in FIG. 19, a passage detecting sensor 341 is disposed between the reservoir section 318 and the processor section 325. As shown in FIG. 23, the passage detecting sensor 341 comprises a light-emitting element 341A and a light-receiving element 341B that are disposed in such a manner as to oppose each other with the paper transporting path located therebetween. Both the light-emitting element 341A and the light-receiving element 341B are connected to the controller 340. The passage detecting sensor 341 detects the passage of the color print paper 315 being transported to the processor section 325, and outputs the detected result ot the controller 340. When the passage of the color print paper 315 is thus detected by the passage detecting sensor 341, the controller 340 determines that the color print paper 315 has just been transported to the interior of the processor section 325.

Disposed in the processor section 325 are a plurality of transport rollers 338 which rotate at a fixed speed as a driving force of an unillustrated motor is imparted thereto. The color print paper 315 which has entered the processor section 325 is transported at a fixed speed by the transport rollers 338, and pass consecutively through the color development section 320, bleach-fixing section 322, rinsing section 324, and drying section 326 of the processor section.

Figure 20:
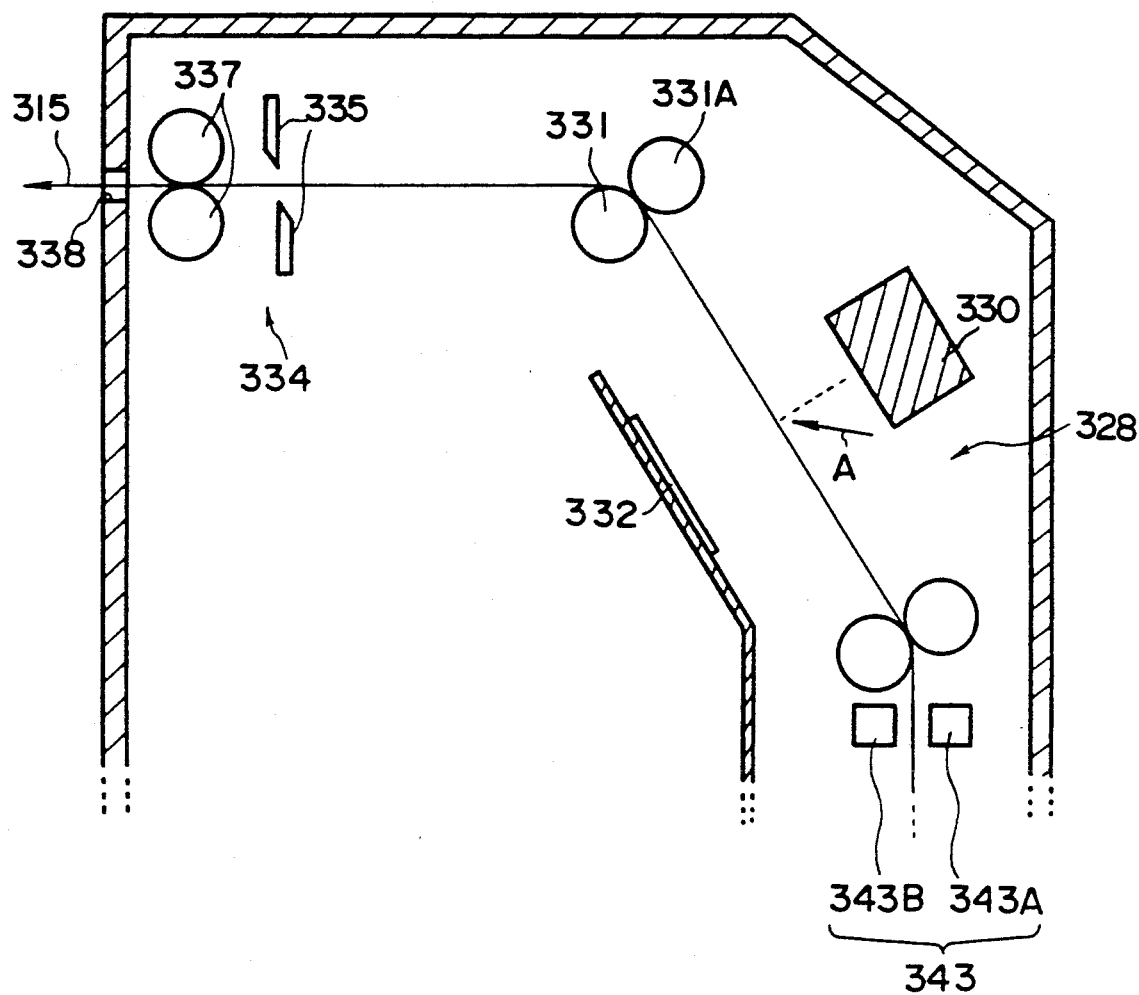
FIG. 20 a schematic cross.sectional view of the density measuring section and its peripheral components shown in FIG. 19.

Disposed between the drying section 326 and the density measuring section 328 is disposed a passage detecting sensor 343 for detecting a jamming of the color print paper 315 (see FIG. 20). The passage detecting sensor 343 comprises a light-emitting element 343A and a light-receiving element 343B that are disposed in such a manner as to oppose each other with the paper transporting path located therebetween. Both the light-emitting element 343A and the light-receiving element 343B are connected to the controller 340 (see FIG. 23). The passage detecting sensor 343 detects the passage of the color print paper 315 being transported from the processor section 325 to the density measuring section 328, and outputs the detected result to the controller 340. When the passage of the color print paper 315 is thus detected by the passage detecting sensor 343, the controller 340 determines that the color print paper 315 has been transported to the outlet side of the processor section 325.

As shown in FIG. 20, the density measuring section 328 comprises the densitometer 330 and a white-color plate 32 used for white-level adjustment and having a reference density. The densitometer 330 and the white-color plate 32 are disposed in face-to-face relationship with each other, and the paper transporting passage is formed between the densitometer 330 and the white-color plate 32. The densitometer 330 is connected to a controller 340. The densitometer 330 measures the densities of the white-color plate 32 and the color print paper 315 by detecting the amount of light which, after being issued from an incorporated light source, is applied to and reflected from the white-color plate 32 and the color print paper 315 at a measuring position (the position indicated by arrow A in FIG. 20) on the transporting path. Upon detection of the densities, the densitometer 330 outputs a signal to the controller 340.

Figure 21:
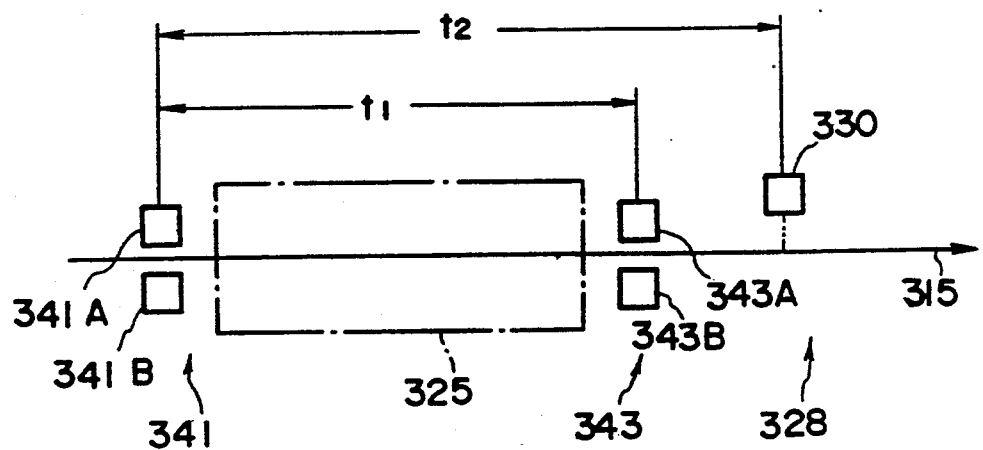
FIG. 21 is a schematic diagram of a transporting path explaining required times.
Figure 22:
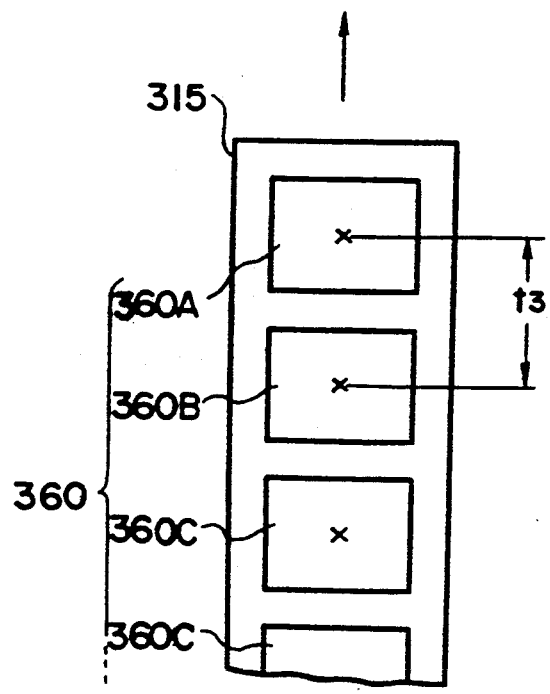
FIG. 22 is a plan view of the color print paper in accordance with the sixth embodiment.

Stored in advance in the controller 340 are a time $t_1$ (see FIG. 21) required until the passage detecting sensor 343 detects the passage of the color print paper after detection of the passage of the paper by the passage detecting sensor 341, as well as a time $t_2$ (see FIG. 21) required until a density-measuring portion of an initial image 360A (see FIG. 22) on the color print paper 315 reaches the density measuring section 328 after detection of the passage of the paper by the passage detecting sensor 341. In this sixth embodiment, the transporting speed of the color print paper 315 in the processor section 325 and the density measuring section 328 is fixed. Accordingly, the required times $t_1$ and $t_2$ are constantly fixed and can be determined by dividing the paper-transporting distance by the transporting speed. A time $t_3$ (see FIG. 22) required for transporting the color print paper 315 by one image-frame portion is also stored in the controller 340. In addition, a display 351 such as a liquid-crystal display or a CRT is connected to the controller 340. Information on a jamming of the color print paper 315 and the like is displayed on the display 351 by means of the controller 340.

Figure 24:
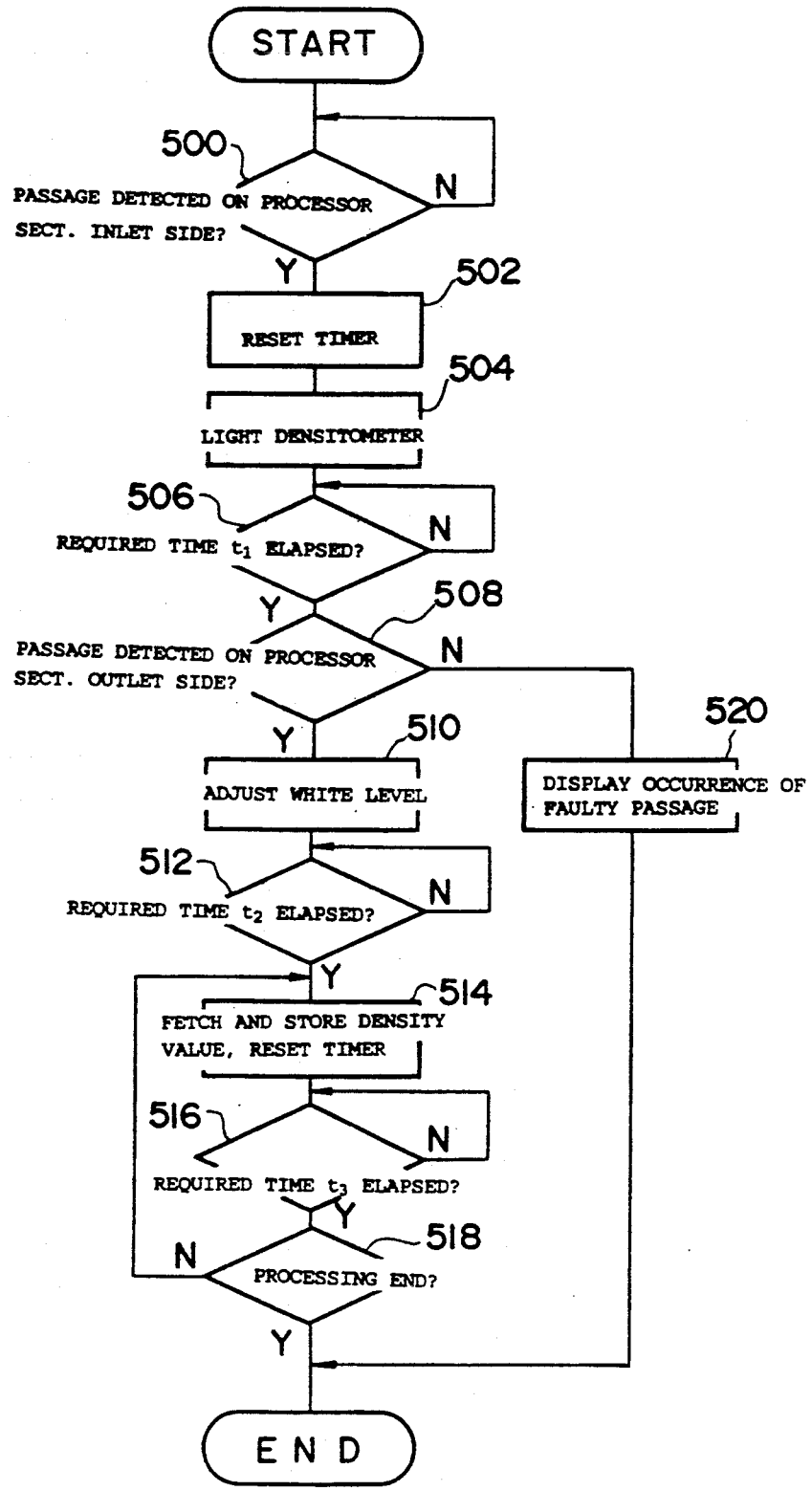
FIG. 24 is a flowchart illustrating operation in accordance with the sixth embodiment.

Referring now to a flowchart shown in FIG. 24, a description will be given of the operation of the sixth embodiment. This flowchart is executed by the controller 340 when a start button for starting the processing operation is pressed by the user of the printer-processor.

Upon the start of processing, a determination is made in Step 500 as to whether or not the passage of the color print paper 315 has been detected by the passage detecting sensor 341 disposed on the inlet side of the processor section 325. If the passage has not been detected, Step 500 is repeated.

When the color print paper 315 reaches the processor section 325, the passage detecting sensor 341 detects the passage of the color print paper 315, whereupon YES is the answer in Step 500, and the operation proceeds to Step 502.

In Step 502, a timer is reset, measurement of a time elapsing since the detection of the passage of the color print paper 315 by the passage detecting sensor 341 is commenced. Then, in Step 504, a lamp of the light source of the densitometer 330 lights up. It takes some time until the amount of light becomes stable after the lamp of the light source is lit. For this reason, in this sixth embodiment, the lamp of the light source lights up immediately after the color print paper 315 is transported to the processor section 325. In Step 506, the timer which was reset in Step 502 is monitored, and a determination is made as to whether or not the elapsed time shown by the timer has reached the required time $t_1$. If the required time $t_1$ has not elapsed since the resetting of the timer, Step 506 is repeated. When the elapsed time reaches the required time $t_1$, the operation proceeds to Step 508.

In parallel with the processing of Steps 502 to 506, the color print paper 315 transported to the interior of the processor section 325 is subjected to various processing in the processor section 325.

In Step 508, the passage detecting sensor 343 disposed on the outlet side of the processor section 325 determines whether or not the passage of the color print paper 315 has been detected by the passage detecting sensor 343. If the passage of the color print paper 315 has not been detected by the passage detecting sensor 343, it is determined that a jamming of the paper 315 has occurred in the processor section 325, and the occurrence of the jamming is displayed on the display 351 in Step 521, whereupon the processing is ended.

When the passage of the color print paper 315 has been detected by the passage detecting sensor 343, it is determined that the color print paper 315 has been properly transported through the interior of the processor section 325, and in Step 510 the white color plate 32 is photometrically measured to effect white-level adjustment, i.e., calibration, for adjusting the output signal to a reference level.

In Step 512, the timer reset in Step 502 is monitored, and a determination is made as to whether or not the elapsed time shown by the timer has reached the required time $t_2$. If the required time $t_2$ has not elapsed since the resetting of the timer, Step 512 is repeated. When the elapsed time has reached the required time $t_2$, the operation proceeds to Step 514. The state in which the required time $t_2$ has elapsed since the setting of the timer is the state in which the density-measuring portion of the image 360A initially copied onto the color print paper 315 has reached the measuring position of the density measuring section 328. Accordingly, in Step 514, an output signal from the densitometer 330 is fetched so as to be stored as the density value of the image 360A. In addition, the timer is reset, and the time elapsing since the measurement of the density of the image 360A is measured.

In Step 516, the timer reset in Step 514 is monitored, and a determination is made as to whether or not the elapsed time shown by the timer has reached the required time $t_3$. If the required time $t_3$ has not elapsed since the resetting of the timer, Step 516 is repeated. When the elapsed time has reached the required time $t_3$, the operation proceeds to Step 518. In Step 518, a determination is made as to whether or not processing has been completed. This determination may be made by judging whether or not a predetermined time has elapsed since the detection of the passage of the paper 315 by the passage detecting sensor 343. Alternatively, the determination may be effected by judging whether or not the output signal from the densitometer 330 has reached the reference level corresponding to the white-color plate 32.

If it is determined in Step 518 that processing has not yet been completed, the operation returns to Step 514 to fetch and store the signal, and Steps 514 to 518 are repeated until YES is given in Step 518. As for the plurality of density values obtained in this process, since the order of the density values obtained corresponds with the order of the plurality of copied images 360, it is possible to effect control by allowing the images 360 to correspond with the density values fetched. If YES is given in the answer in Step 518, processing is ended.

Thus, in this sixth embodiment, since the state of the density-measuring portion of the image 360 being positioned at the measuring position of the density measuring section 328 is attained by controlling the elapsed time, there is no need to provide a sensor or the like for detecting the position of the image. Hence, the arrangement of the printer-processor can be simplified.

In addition, in the sixth embodiment, since the order of the plurality of images 360 copied onto the color print paper 315 corresponds with the order of the density values fetched, it is possible to effect control by allowing the images 360 to correspond with the density values fetched.

In the sixth embodiment, since the white-level adjustment by the densitometer 330 is made when the passage detecting sensor 343 disposed between the processor section 325 and the density measuring section 328 has detected the passage of the color print paper 315, it is possible to minimize the variation of the output signal due to fluctuations of a supply voltage or the like. Hence, more accurate output signals can be obtained.

In the sixth embodiment, since the lamp of the light source of the densitometer 330 is turned on when the passage detecting sensor 341 disposed on the inlet side of the processor section 325 has detected the passage of the color print paper 315, the amount of light of the light source becomes stable during density measurement.

Although in the sixth embodiment the level adjustment of the output signal from the density measuring section 328 is effected when the passage detecting sensor 343 has detected the passage of the color print paper 315, an arrangement may be alternatively provided such that, by omitting the passage detecting sensor 343, the level adjustment of the output signal from the density measuring section 328 may be effected immediately before the lapse of a time which corresponds to a time elapsing since the passage of the color print paper 315 is detected by the passage detecting sensor 341 until the color print paper 315 reaches the density measuring section 328.

A description will now be given of a seventh embodiment. It should be noted that components or portions that are identical with those of the sixth embodiment will be denoted by the same reference numerals, and a description thereof will be omitted.

Figure 25:
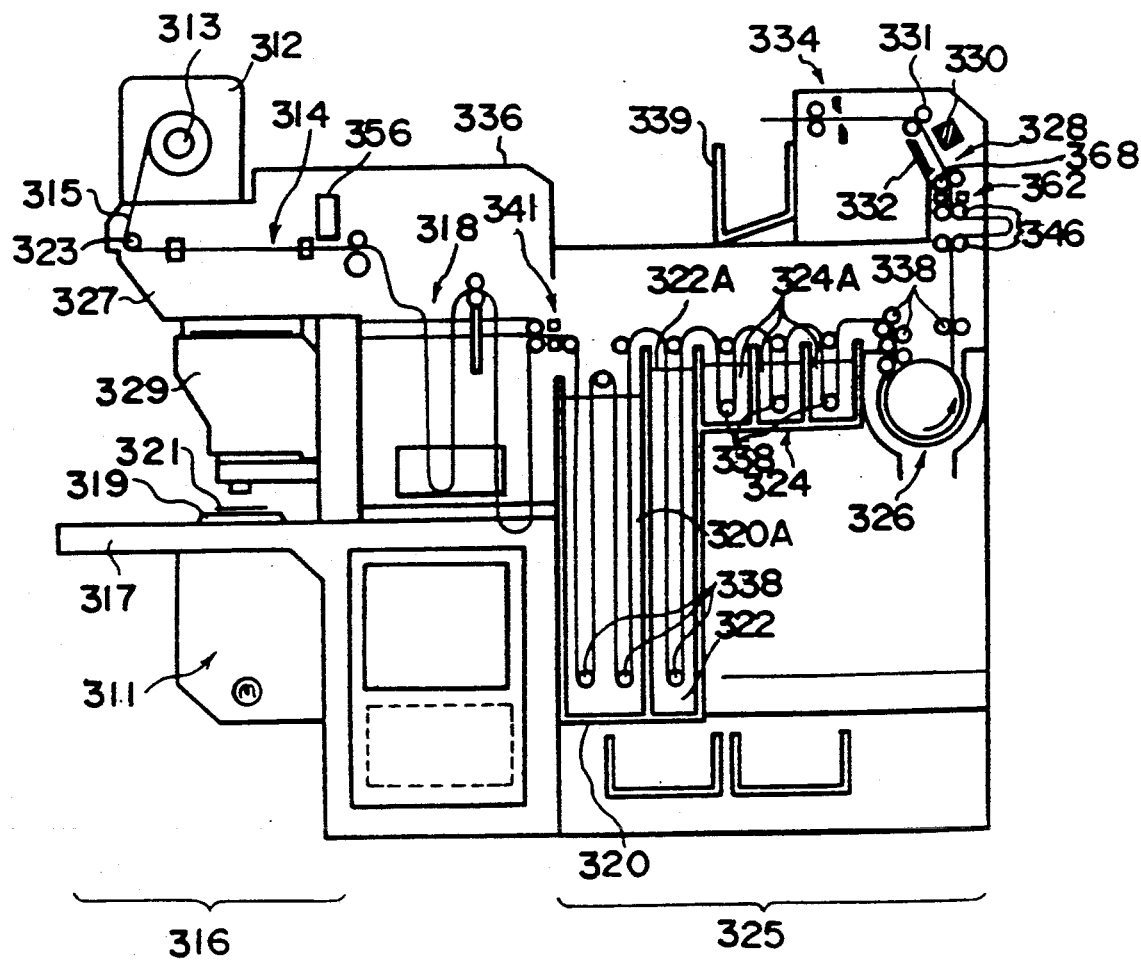
FIG. 25 is a schematic diagram of a printer-processor in accordance with a seventh embodiment.

FIG. 25 illustrates a printer-processor in accordance with the seventh embodiment. In this seventh embodiment, the puncher 356 described in the fourth embodiment is disposed between the exposure chamber 314 and the reservoir section 318. As a result, as shown in FIG. 15, a hole 358A corresponding to an image 360A is punched at a position spaced apart the distance a from a density-measuring portion of the image 360 downstream in the direction of travel of the paper.

In addition, a punched-hole detecting section 362 is disposed at a position between the drying section 326 and the density measuring section 328, the passage detecting sensor 343 being disposed at that position in the sixth embodiment. The punched-hole detecting section 362 comprises a light-emitting element 364 and a light-receiving element 366 that are disposed in such a manner as to face each other with the paper transporting path located therebetween. The light-emitting element 364 and the light-receiving element 366 are respectively connected to the controller 340 (see FIG. 27). The light-emitting element 364 issues a beam of light toward the light-receiving element 366, while the light-receiving element 366 receives the beam of light transmitted through the punched hole 358 in the color print paper 315, converts it to an electrical signal and outputs it to the controller 340. When the magnitude of the electrical signal outputted from the light-receiving element 366 is a predetermined value or higher, the controller 340 determines that the punched hole has been detected. Additionally, the detecting position of the punched-hole detecting section 362 is set to be the position indicated by arrow B in FIG. 26, and is spaced apart from a measuring position (the position indicated by arrow A in FIG. 26) of the densitometer 330 in the density measuring section 328 by a distance b along the paper transporting path.

Figure 27:
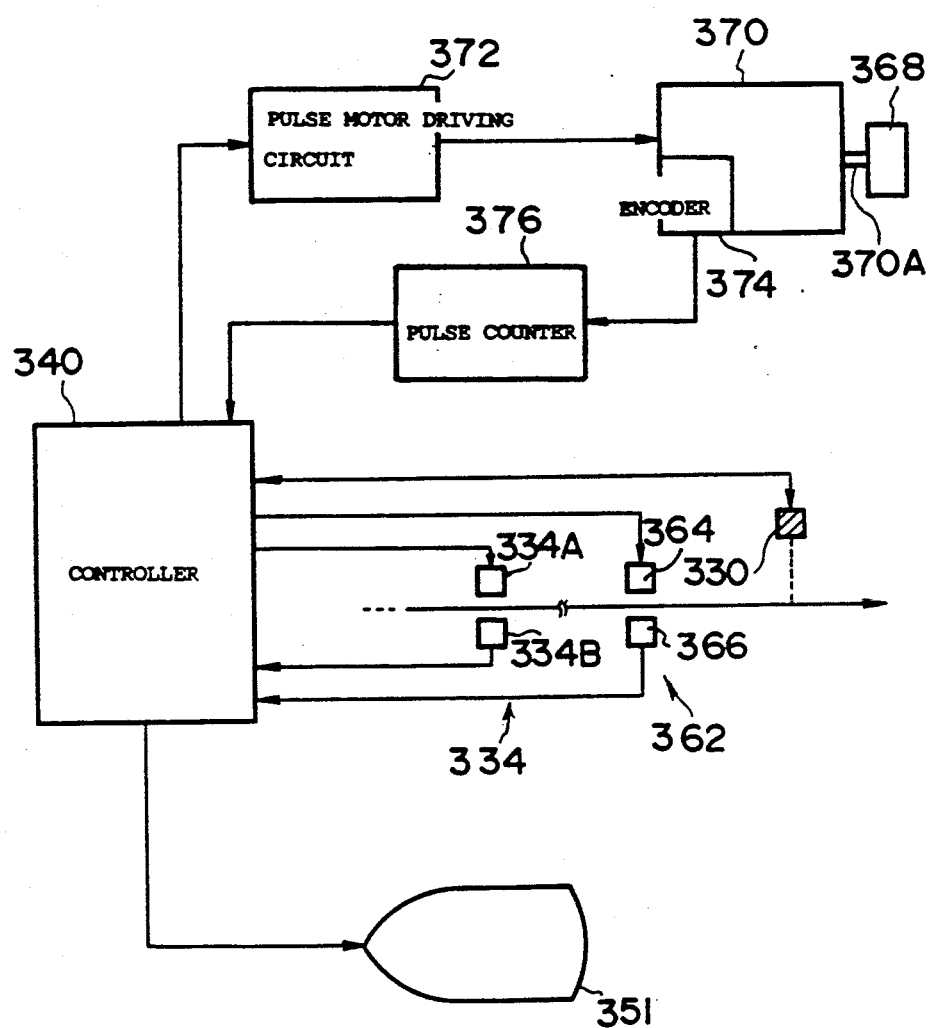
FIG. 27 is a schematic block diagram in accordance with the seventh embodiment.

A transport roller 368 and a roller 368A are disposed between the punched-hole detecting section 362 and the density measuring section 328. As shown in FIG. 27, the transport roller 368 is affixed to a rotating shaft 370A of a pulse motor 370 and rotates as a driving force of the pulse motor 370 is transmitted thereto, thereby transporting the paper 315 while clamping the same. The pulse motor 370 is connected to the controller 340 via a pulse motor driving circuit 372, and its drive is controlled by the controller 340. In addition, the pulse motor 370 incorporates an encoder 374 for converting the amount of rotation of the rotating shaft 370A to a number of pulses. The encoder 374 is connected to the controller 340 via a pulse counter 376 for integrating the number of pulses outputted by the encoder 374. As a result, the controller 340 is capable of detecting the amount of rotation of the rotating shaft 370A of the pulse motor 370, i.e., the transported distance of the paper 315.

Figure 26:
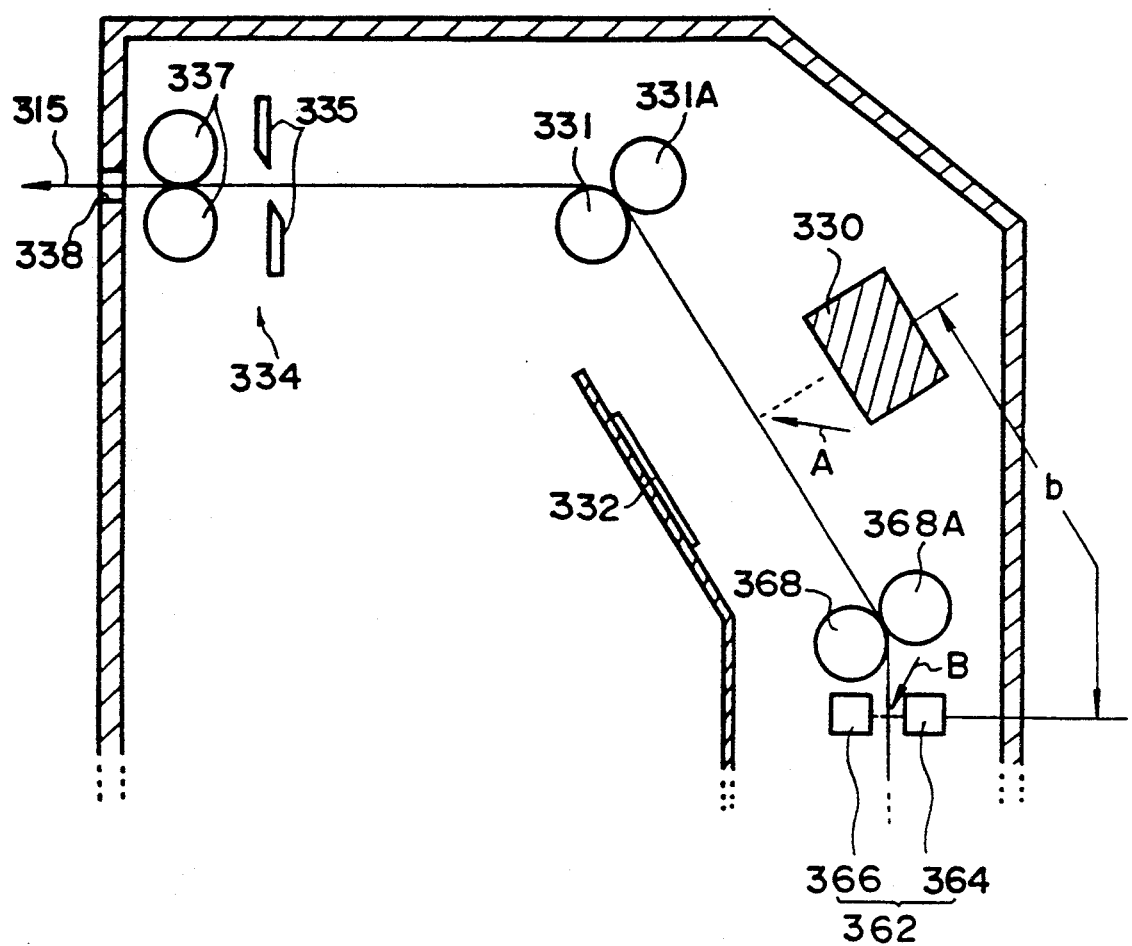
FIG. 26 is a schematic cross-sectional view of the density measuring section and its peripheral components shown in FIG. 25.

In addition, the controller 340 stores as a number of pulses N the distance between the density-measuring portion of the image and the measuring position (the position indicated by arrow B in FIG. 26) of the density measuring section 328, i.e., a distance corresponding to a sum of the distance a shown in FIG. 15 and the distance b shown in FIG. 26.

Figure 28:
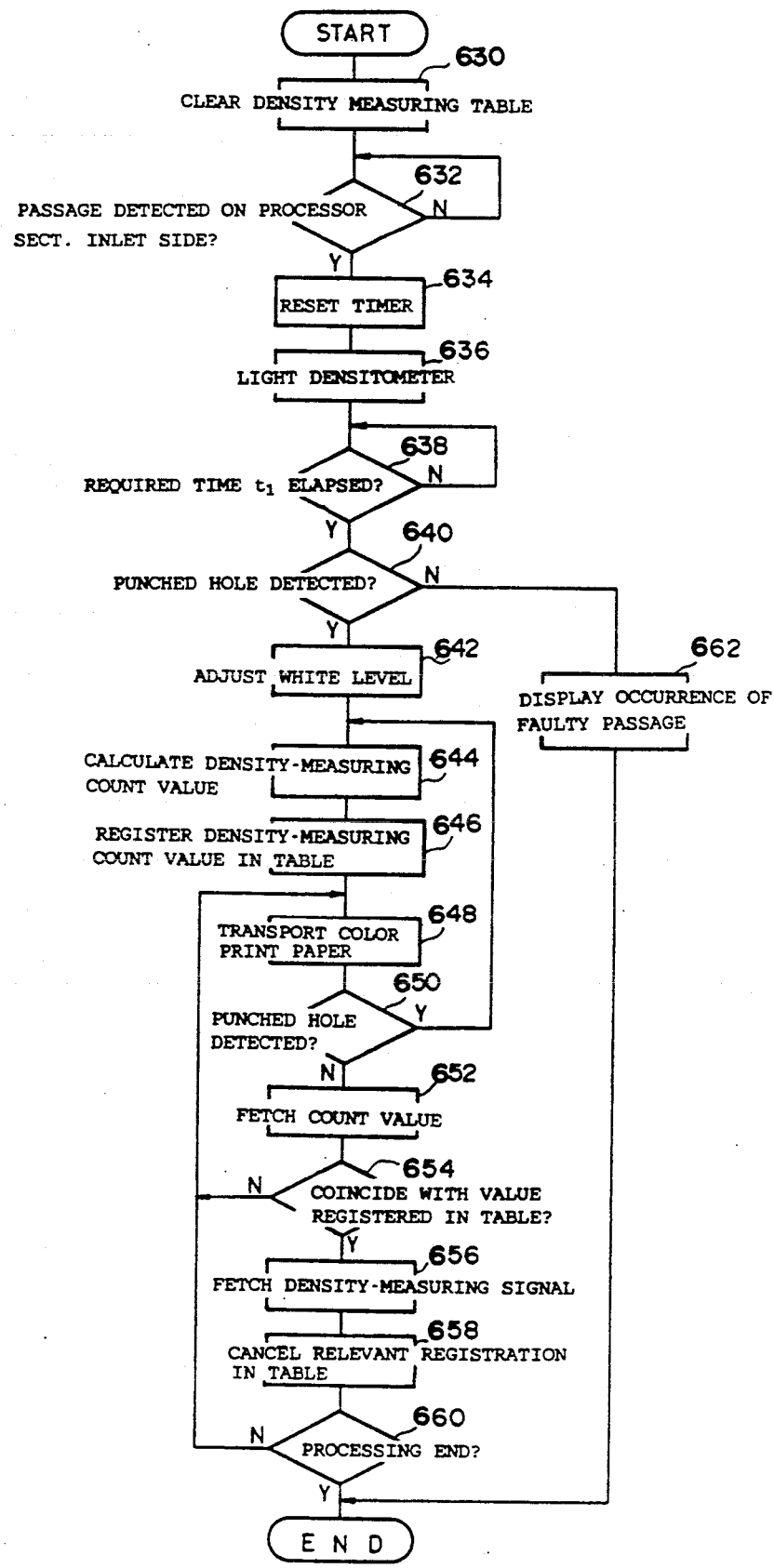
FIG. 28 is a flowchart illustrating operation in accordance the seventh embodiment.

Referring now to a flowchart shown in FIG. 28, a description will be given of the operation of this seventh embodiment. It should be noted that this flowchart is executed by the controller 340 when the start button for starting the processing operation is pressed by the user of the printer-processor in the same way as the sixth embodiment.

Upon the start of processing, in Step 630, a density measuring table is cleared. In the density measuring table, a plurality of timings for fetching the output signal from the densitometer 330 to the controller 340 are registered in advance as count values of the number of pulses. In an ensuing Step 632, a determination is made as to whether or not the passage of the color print paper 315 has been detected by the passage detecting sensor 341. While the passage is not being detected, Step 632 is repeated.

Upon the start of processing, the image on the negative film 321 set on the negative carrier 319 is copied onto the color print paper 315 in the copying section 316. At this time, the puncher 356 is simultaneously actuated. As a result, as shown in FIG. 15, a hole 358 corresponding to each image 360 copied onto the color print paper 315 is punched at a position spaced apart the distance a from the density-measuring portion of each image. The color paper 315 punched with the holes 358 is transported to the processor section 325 via the reservoir section 318. When the color print paper 315 is transported to the processor section 325, the passage detecting sensor 341 detects the passage of the color print paper 315, whereupon YES is given as the answer in the determination in Step 632, and the operation proceeds to Step 634.

In Step 634, the timer is reset, and the measurement of a time elapsing since the passage detecting sensor 341 detected the passage of the color print paper 315 is started. Then, in Step 636, the lamp of the light source of the densitometer 330 lights up. In Step 638, the timer reset in Step 634 is monitored, and a determination is made as to whether or not the elapsed time shown by the timer has reached the aforementioned required time $t_1$. If the required time t1 has not elapsed since the resetting of the timer, Step 638 is repeated. If the elapsed time has reached the required time $t_1$, the operation proceeds to Step 640.

In Step 640, a determination is made as to whether or not the punched-hole detecting section 362 disposed on the outlet side of the processor section 325 has detected the punched hole 358 in the color print paper 315, i.e., determination is made as to whether or not the paper 315 has been transported to the outlet side of the processor section 325. If the punched-hole detecting section 362 has not detected the passage of the color print paper 315, it is determined that a jamming of the paper 315 has occurred in the processor section 325, so that the occurrence of the jamming is displayed on the display 352 in Step 662, and the processing is ended.

If the punched-hole detecting section 362 has detected the punched hole 358 in the color print paper 315, it is determined that the color print paper 315 has been transported properly in the processor section 325, and in Step 442 white-level adjustment is effected in which the white-color plate 32 is photometrically measured and the output signal is set as a reference level. Since the timing of this white-level adjustment is immediately before the density measuring section 328 effects the density measurement of the image 360, it is possible to minimize the variation of the output signal from the densitometer 330 due to fluctuations of the supply voltage or the like.

In Step 644, the count value S of the pulse counter 376 is fetched. In Step 646, a calculation is made of the arithmetic value C of the number of pulses indicating the count value of the pulse counter 376 in a state in which the density-measuring portion of the image 360 corresponding to the detected punched hole 358 is positioned at the density-measuring position. This arithmetic value is registered in the density measuring table. The arithmetic value C can be derived from a sum of the number of pulses N stored in advance in the controller 340 and the count value S fetched in Step 644. A state in which the count value S of the pulse counter 376 is equal to the arithmetic value C of the number of pulses thus obtained corresponds to a timing for effecting cut processing.

In Step 648, the pulse motor 370 is driven to transport the color print paper 315. In Step 650, a determination is made as to whether or not the punched-hole detecting section 62 has detected the punched hole 358 in the color print paper 315. If the punched hole has not been detected, the count value of the pulse counter 376 is fetched in Step 652, and the operation proceeds to Step 654. In Step 654, a determination is made as to whether or not the count value of the number of pulses fetched in Step 652 has been registered in the density measuring table. If NO is the answer in that determination, the operation returns to Step 648, and Steps 648 to 654 are repeated until the punched hole 358 is detected or the value registered in the density measuring table coincides with the count value of the pulse counter 376. If YES is the answer in the determination in Step 650, the operation returns to Step 644 to calculate the arithmetic value C of the number of pulses, and the arithmetic value C calculated is registered in the density measuring table in Step 646.

If YES is the answer in the determination in Step 654, the operation proceeds to Step 656. In this state, the density-measuring portion of the image 360 is positioned at the density measuring position. For this reason, in Step 656, the density-measured signal outputted from the densitometer is fetched. In Step 658, the relevant registration in the cut processing table is canceled. In Step 660, a determination is made as to whether or not processing has been completed. This determination may be effected by judging whether the punched-hole detecting sensor 362 has not detected the punched hole for a predetermined time or more, or the determination may be made by judging whether no registration is found in the density measuring table after executing Step 658. If it is determined in Step 660 that processing has not been completed, the operation returns to Step 648. If YES is the answer in the determination in Step 660, processing is ended.

Thus, in the seventh embodiment, the hole 358 corresponding to the image 360 is punched by the puncher 356, and level adjustment of the output signal from the density measuring section 330 is effected when the punched-hole detecting section 362 has detected the punched hole 358. Hence, it is possible to minimize the variation of the output signal due to fluctuations of a supply voltage or the like. and more accurate output signals can be obtained.

In the seventh embodiment, since the white-level adjustment and density measurement are effected on the basis of the timing at which the punched-hole detecting section 362 detects the punched hole, it is not necessary to separately provide a sensor or the like, so that the arrangement of the printer-processor can be simplified.

Although in the seventh embodiment the level adjustment of the output signal from the density measuring section 330 is effected when the punched-hole detecting section 362 detects the punched hole 358, the present invention is not restricted to the same. For instance, an arrangement may be provided alternatively such that the level adjustment of the output signal may be effected after the lapse of a fixed time since the punched hole is detected by the punched-hole detecting section 362.

Although in the sixth and seventh embodiments a description has been given of the processing of a single color print paper 315, the present invention is applicable to a case where a plurality of color print papers 315 are consecutively subjected to processing.

In addition, although in the sixth embodiment the passage detecting sensor 341, i.e., a passage detecting means, is disposed between the reservoir section 318 and the processor section 325, it suffices if the passage detecting sensor 341 is disposed upstream of the density measuring section 328 in the direction of travel of the color print paper 315. For instance, the passage detecting sensor 341 may be disposed in any of the exposure chamber 314, the reservoir section 318, and the processor section 325.

Although in the sixth and seventh embodiments the output signal from the densitometer 330 is fetched in the state in which the density-measuring portion of the image 360 is positioned in the measuring position of the density measuring section 328, an arrangement may be alternatively provided such that the transport of the color print paper 315 is stopped with the density-measuring portion of the image 360 positioned at the measuring position of the density measuring section 328, and the densitometer 330 is then operated so as to obtain a density value.

Furthermore, although in the sixth and seventh embodiments the signal fetched is stored in the controller 340 as a density value, the measured result may be printed out.

WHAT IS CLAIMED IS

1. A method for evaluating a print, comprising the steps of:
    developing in a film developing section a film-development evaluating film with a series of evaluating latent images, different in density, recorded thereon;
    printing onto a paper the image on the film obtained by development;
    developing the printed paper in a paper developing section; and
    measuring a density of a print obtained by development so as to evaluate the quality of the print.

2. A method for evaluating a print according to claim 1, wherein both the evaluation of the performance of film development and the determination of exposure conditions at a time of printing the paper are effected by photometrically measuring an image on the evaluating film obtained by development.

3. A method for evaluating a print according to claim 1, wherein evaluating latent images whose densities become at least a low density, a medium density, and a high density are recorded on the evaluating film, and a difference between two densities of a latent image-recorded portion is selectively used for the evaluation of the performance of a film developing solution and the performance of a paper developing solution.

4. A method for evaluating a print according to claim 3, wherein at the time of printing images on the evaluating film onto the paper, at least two images having different densities among at least the three evaluating densities of the low density, medium density, and high density are printed onto the paper with an identical exposure amount.

5. A method for setting printing conditions, comprising the steps of:
    developing in a film developing section a film. development evaluating film with a series of evaluating latent images, different in density, recorded thereon;
    photometrically measuring the image on the evaluating film obtained by development, and printing the image onto a paper;
    developing the printed paper printed in a paper developing section; and
    measuring a density of a print obtained by development so as to set standard exposure conditions.

6. A method for setting printing conditions according to claim 5, wherein at the time of printing images on the evaluating film onto the paper, the standard exposure conditions are set such that densities of prints based on at least one film density of an image or one set of images become their respective targeted densities.

7. A copying apparatus for exposing an original image supported on a film carrier onto a copying photosensitive material by application of light thereto from a light source via a light-adjusting filter, wherein a light-attenuating filter formed of a nontransparent member and having a multiplicity of small holes or small-width slits for setting a copying condition is disposed in a path of exposing light between said light source and said film carrier in such a manner as to be capable of moving into or out of the path of the exposing light.

8. A copying apparatus according to claim 7, wherein said light-attenuating filter is formed integrally of a transparent member and said nontransparent member.

9. A copying apparatus according to claim 7, wherein a small-width slit is provided in said nontransparent member having the multiplicity of small-width slits, said small width slit being oriented in a direction different from a longitudinal direction of each of said small-width slits.

10. A copying apparatus according to claim 7, wherein by moving said light-attenuating filter into the path of the exposing light, at least one of the variation of an amount of light applied to the original image, the variation of a position of said light-adjusting filter, and the variation of development processing of the copying photosensitive material is measured, or at least one of the setting of the standard exposure conditions, control of the standard exposure conditions, and maintenance of the standard exposure conditions is effected.

11. A copying apparatus controller for controlling a copying apparatus having an exposing section and a developing section, comprising:
storage means for storing, together with a time of storage, control data representing a state of at least one of said exposing section and said developing section; and
displaying means for displaying in a time series the contents stored in said storage means.

12. A copying apparatus controller for controlling a copying apparatus having an exposing section and a developing section, comprising:
first detecting means for detecting a change in said exposing section;
second detecting means for detecting a change in said developing section;
storage means for storing, together with a time of detection, a detected value of said first detecting means and a detected value of said second detecting means; and
displaying means for displaying in a time series the contents stored in said storage means.

13. A copying apparatus controller for controlling a copying apparatus having an exposing section and a developing section, comprising:
first detecting means for detecting a change with respect to said exposing section;
second detecting means for detecting a change with respect to said developing section;
setting means for setting data for maintaining a proper state on the basis of said first and second detecting means;
storage means for storing, together with a time of detection or setting, a detected value of said first detecting means, a detected value of said second detecting means, and a set value of said setting means; and
displaying means for displaying in a time series the contents stored in said storage means.

14. A copying apparatus controller according to claim 12, wherein said first detecting means detects a change in a light source system of said exposing section.

15. A copying apparatus controller according to claim 13, wherein said first detecting means detects a change in a light source system of said exposing section.

16. A copying apparatus comprising:
transporting means for transporting along a transporting path a copying photosensitive material having an image copied thereon, the copying photosensitive material being provided with a mark in correspondence with a density-measuring portion of the copied image;
mark detecting means for detecting the presence or absence of the mark at a predetermined position on the transporting path;
a density measuring section disposed at a position for obtaining a corresponding relationship between the density-measuring portion and the mark relative to the predetermined position; and
controlling means for controlling the density-measuring portion in such a manner that a density value measured by said density measuring section is fetched when the presence of the mark is detected by said mark detecting means.

17. A copying apparatus comprising:
transporting means for transporting along a transporting path a copying photosensitive material having an image copied thereon, the copying photosensitive material being provided with a mark in correspondence with a density-measuring portion and cutting portion of the copied image;
mark detecting means for detecting the presence or absence of the mark at a predetermined position on the transporting path;
a density measuring section disposed at a position for obtaining a corresponding relationship between the density-measuring portion and the mark relative to the predetermined position;
a cutter section for cutting the copying photosensitive material at a predetermined cutting position on the transporting path; and
controlling means for controlling the density-measuring portion in such a manner that a density value measured by said density measuring section is fetched when the presence of the mark is detected by said mark detecting means, and for actuating said cutter section on the basis of a timing at which the presence of the mark is detected by said mark detecting means.

18. A copying apparatus according to claim 17, wherein said cutter section is disposed at a position for obtaining a corresponding relationship between the cutting portion and the mark relative to the predetermined position.

19. A copying apparatus according to claim 17, wherein said mark detecting means is disposed on the transporting path between said density measuring section and said cutter section.

20. A copying apparatus according to claim 18, wherein said mark detecting means is disposed on the transporting path between said density measuring section and said cutter section.

21. A copying apparatus having a copying section for copying an image onto a copying photosensitive material in accordance with copying conditions, the copying conditions being corrected on the basis of a density of the copied image, comprising:

a processing section for processing the copying photosensitive material with the image copied thereon, while transporting the copying photosensitive material;

a density measuring section disposed on an outlet side of said processing section and adapted to output a signal by measuring the density of the image;

passage detecting means for detecting the passage of the copying photosensitive material upstream of said density measuring section in a direction of travel of the copying photosensitive material; and controlling means for effecting control in such a manner that the signal outputted from said density measuring section is fetched thereby after the lapse of a time corresponding to a time elapsing since the passage of the copying photosensitive material is detected by said passage detecting means until the copying photosensitive material reaches the density measuring section.

22. A copying apparatus having a copying section for copying an image onto a copying photosensitive material in accordance with copying conditions, the copying conditions being corrected on the basis of a density of the copied image, comprising:

a processing section for processing the copying photosensitive material with the image copied thereon, while transporting the copying photosensitive material;

a density measuring section disposed on an outlet side of said processing section and adapted to output a signal by measuring the density of the image; and controlling means for fetching the signal outputted from said density measuring section and for controlling said density measuring section in such a manner as to effect the level adjustment of the output signal from said density measuring section immediately before the copying photosensitive material processed in said processing section passes through said density measuring section.

23. A copying apparatus according to claim 22, further comprising passage detecting means for detecting the passage of the copying photosensitive material upstream of said density measuring section in a direction of travel of the copying photosensitive material, wherein said controlling means controls said density measuring section in such a manner as to effect the level adjustment of the output signal from said density measuring section immediately before the lapse of a time corresponding to a time elapsing since the passage of the copying photosensitive material is detected by said passage detecting means until the copying photosensitive material reaches the density measuring section.

24. A copying apparatus according to claim 22, wherein a mark is imparted to the copying photosensitive material in correspondence with a position of an image, and there is provided mark detecting means for detecting the presence or absence of the mark at a predetermined position on a copying photosensitive material transporting path, wherein the level adjustment of the output signal from said density measuring section is effected on the basis of a timing at which the presence of the mark is detected by said mark detecting means.

25. A copying apparatus according to claim 22, further comprising detecting means disposed between said processing section and said density measuring section and adapted to detect the passage of the copying photosensitive material, wherein said controlling means controls said density measuring section in such a manner as to effect the level adjustment of the output signal from said density measuring section when the passage of the copying photosensitive material is detected by said detecting means.

* * * * *